United States Patent
Srinivasan et al.

(10) Patent No.: US 8,416,733 B2
(45) Date of Patent: Apr. 9, 2013

(54) TIME TRACKING LOOPS FOR A COMMUNICATION SYSTEM UTILIZING A CYCLIC PREFIX

(75) Inventors: Shivratna G. Srinivasan, San Diego, CA (US); Michael L. McCloud, San Diego, CA (US); Remi J. Gurski, San Diego, CA (US); Sunil Kumar Kandukuri Narayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 12/825,146

(22) Filed: Jun. 28, 2010

(65) Prior Publication Data

US 2011/0149943 A1      Jun. 23, 2011

Related U.S. Application Data

(60) Provisional application No. 61/221,980, filed on Jun. 30, 2009.

(51) Int. Cl.
  *H04B 7/212* (2006.01)
(52) U.S. Cl.
  USPC .......................................... 370/324; 370/210
(58) Field of Classification Search .......... 370/208–210, 370/343, 359, 419, 463; 455/63.1
  See application file for complete search history.

(56) References Cited

U.S. PATENT DOCUMENTS

| | | | |
|---|---|---|---|
| 2005/0008088 A1* | 1/2005 | Liu et al. ......................... | 375/260 |
| 2006/0227812 A1* | 10/2006 | Vrcelj et al. ................... | 370/503 |
| 2007/0053473 A1 | 3/2007 | Palin | |
| 2007/0110174 A1 | 5/2007 | Glazko et al. | |
| 2010/0166050 A1* | 7/2010 | Aue ............................... | 375/224 |
| 2011/0002403 A1* | 1/2011 | Wilhelmsson et al. ....... | 375/260 |
| 2011/0158342 A1 | 6/2011 | Srinivasan et al. | |

FOREIGN PATENT DOCUMENTS

WO    WO2007074388 A2    7/2007

OTHER PUBLICATIONS van de Beek, J.-J.; Borjesson, P.O.; Boucheret, M.-L.; Landstrom, D.; Arenas, J.M.; Odling, P.; Ostberg, C.; Wahlqvist, M.; Wilson, S.K. Selected Areas in Communications, IEEE Journal on vol. 17, Issue: 11 Digital Object Identifier: 10.1109/49.806820 Publication Year: 1999, pp. 1900-1914.*

(Continued)

*Primary Examiner* — Gary Mui
(74) *Attorney, Agent, or Firm* — Kenneth Vu

(57) ABSTRACT

Techniques for performing time tracking in a communication system utilizing a cyclic prefix are described. In an aspect, a receiver may detect for large timing errors based on early and late received samples obtained with early and late FFT windows, respectively. The receiver may derive first and second channel impulse response (CIR) estimates based on the early and late received samples, respectively, determine an early channel energy based on the first CIR estimate, determine a late channel energy based on the second CIR estimate, compute an update amount based on the early and late channel energies, and update the FFT window position based on the update amount. In another aspect, the receiver may perform time tracking with an inner time tracking loop (TTL) and an outer TTL. The receiver may update the FFT window position in coarse steps with the outer TTL and in fine steps with the inner TTL.

20 Claims, 14 Drawing Sheets

OTHER PUBLICATIONS

Hao Zhou, et al. "Fine Timing Synchronization Using Power Delay Profle for OFDM Systems" Conference Proceedings/IEEE International Symposium on Circuit and Systmes (ISCAS) : May 23-26, 2005, International Conferenace Center, Kobe, Japan, IEEE Service Center, Piscataway, N.J, May 23, 2005, pp. 2623-2626, XP010816060 ISBN: 978-0/7803-.*

W-L Chin, et al., "A Blind Synchronizer for OFDM System based on SINR maximization in Multipath Fading Channels" IEEE Transactions on Vehicular Technology, IEEE Service Center, Piscataway, NJ, US, vol. 58, No. 2, Feb. 1, 2009, pp. 625-635, XP011247215 ISSN: 0018-9545.*

Giovanni Santella: "A Frequency and Symbol Synchronization System for OFDM Signals: Architecture and Simulation Results", IEEE Transactions on Vehicular Technology, IEEE Service Center, Piscataway, NJ, US, vol. 49, No. 1, Jan. 1, 2000, XP011064010, ISSN: 0018-9545 figures 2,5,6.

Hao Zhou, et al., "Fine Timing Synchronization Using Power Delay Profile for OFDM Systems" Conference Proceedings / IEEE International Symposium on Circuits and Systems (ISCAS) : May 23-26, 2005, International Conference Center, Kobe,Japan, IEEE Service Center, Piscataway,NJ, May 23, 2005, pp. 2623-2626, XP010816060 ISBN: 978-0/7803-8834-5.

International Search Report and Written Opinion—PCT/US2010/040675—International Search Authority, European Patent Office,Feb. 4, 2011.

Partial International Search Report—PCT/US2010/040675—International Search Authority, European Patent Office, Oct. 12, 2010.

W-L Chin, et al., "A Blind Synchronizer for OFDM Systems Based on SINR Maximization in Multi path Fading Channels" IEEE Transactions on Vehicular Technology, IEEE Service Center, Piscataway, NJ, US, vol. 58, No. 2, Feb. 1, 2009, pp. 625-635, XP011247215 ISSN: 0018-9545.

Yang, et al., "Timing Recovery for OFDM Transmission", Nov. 2000, IEEE, p. 2278-2284.

* cited by examiner

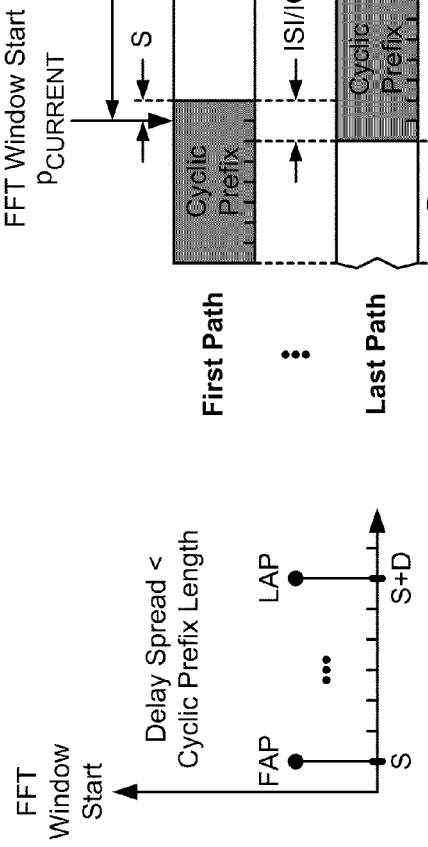
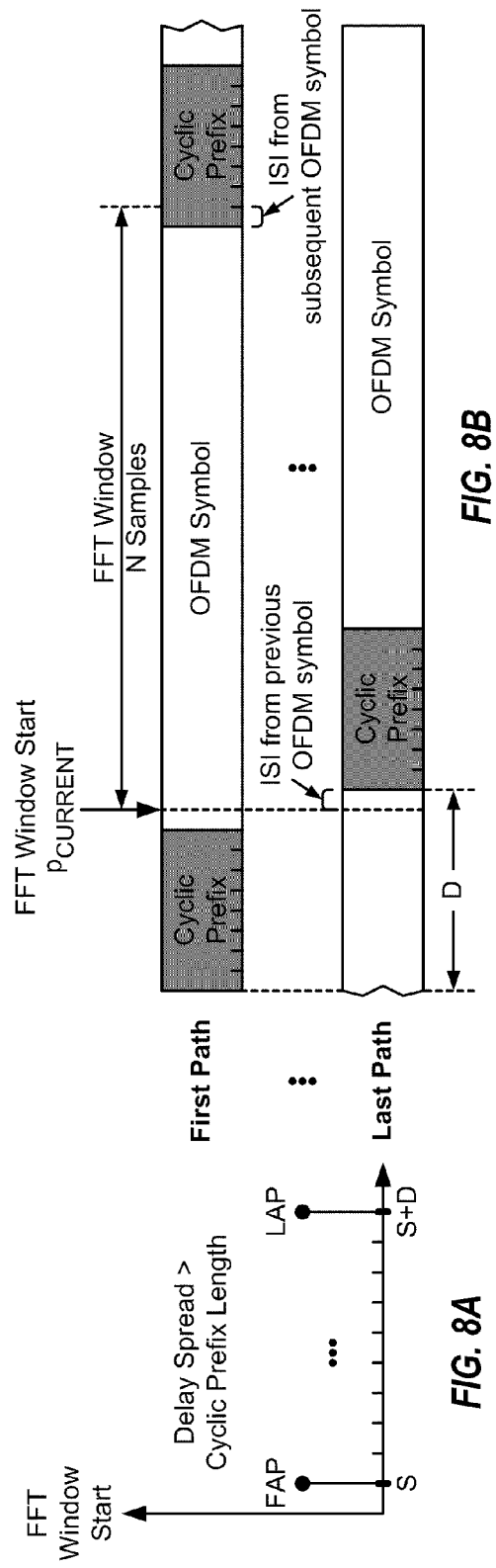
FIG. 7A
FIG. 7B
FIG. 8A
FIG. 8B

TIME TRACKING LOOPS FOR A COMMUNICATION SYSTEM UTILIZING A CYCLIC PREFIX

The present application claims priority to provisional U.S. Application Ser. No. 61/221,980, entitled "SYSTEMS AND METHODS OF TIME TRACKING OUTER LOOP IN AN OFDM SYSTEM BASED ON RS SYMBOLS," filed Jun. 30, 2009, assigned to the assignee hereof and incorporated herein by reference.

BACKGROUND

I. Field

The present disclosure relates generally to communication, and more specifically to techniques for performing time tracking at a receiver in a communication system.

II. Background

In a communication system, a transmitter may process (e.g., encode, interleave, and symbol map) data to generate data symbols. The transmitter may further process the data symbols to generate a modulated signal and may transmit the modulated signal via a communication channel. The modulated signal may travel via a number of signal paths in the communication channel and may also observe noise and interference. A receiver may obtain a received signal composed of different versions of the modulated signal received via different signal paths. The receiver may perform complementary processing on the received signal to recover the data sent by the transmitter.

A challenge for the receiver is determining the proper timing for selecting samples for processing. If the timing is not set properly, then the receiver may observe more inter-symbol interference (ISI) and inter-carrier interference (ICI), which may degrade a carrier-to-interference-plus-noise ratio (CINR). The degraded CINR may limit the data rate at which data can be reliably sent to the receiver. There is therefore a need in the art for techniques to set the timing of the receiver such that good performance can be obtained.

SUMMARY

Techniques for performing time tracking at a receiver in a communication system utilizing a cyclic prefix are described herein. A cyclic prefix is a repeated portion of a data/useful portion and is often used to combat delay spread due to multiple signal paths, which may cause ISI and ICI. A cyclic prefix may be used for orthogonal frequency division multiplexing (OFDM), single-carrier frequency division multiplexing (SC-FDM), etc. An OFDM symbol or an SC-FDM symbol may include (i) a useful portion comprising N samples and (ii) a cyclic prefix comprising G samples, where N is the total number of subcarriers and G is the cyclic prefix length. At the receiver, a fast Fourier transform (FFT) window may be used to select N samples of an OFDM symbol or an SC-FDM symbol for processing and to discard the remaining samples. The receiver may perform time tracking to properly place the FFT window so that good performance can be obtained.

In an aspect, the receiver may detect for large timing errors based on (i) early received samples obtained with an early FFT window and (ii) late received samples obtained with a late FFT window. The early and late FFT windows may be placed at sufficiently large offsets (e.g., at least one cyclic prefix length) from the current FFT window position. In one design, the receiver may derive a first channel impulse response (CIR) estimate based on the early received samples and may derive a second CIR estimate based on the late received samples. The receiver may then determine an early channel energy based on the first CIR estimate and may determine a late channel energy based on the second CIR estimate. The receiver may then update the FFT window position based on the early and late channel energies. For example, the receiver may determine an update amount based on a difference between the early and late channel energies and may update the FFT window position by the update amount.

In another aspect, the receiver may perform time tracking with a time tracking loop (TTL) comprising an inner TTL and an outer TTL. The receiver may update the FFT window position in coarse steps with the outer TTL and may also update the FFT window position in fine steps with the inner TTL. The outer TTL may have a wider range of operation and may be able to resolve ambiguity in first arriving path (FAP) and last arriving path (LAP) in a CIR estimate. The inner TTL may have a more narrow range of operation and may adjust the FFT window position in fine steps based on an assumption that ambiguity in the FAP and LAP is removed. The combination of the inner TTL and the outer TTL may provide fast timing adjustments for large timing errors and fine timing adjustments for small timing errors.

Various aspects and features of the disclosure are described in further detail below.

BRIEF DESCRIPTION OF THE DRAWINGS

FIGS. 7A and 8A show two exemplary CIRs.
FIGS. 7B and 8B show reception of an OFDM symbol in two scenarios with different delay spreads.

DETAILED DESCRIPTION

The time tracking techniques described herein may be used for various communication systems that utilize a cyclic prefix. A cyclic prefix is a repeated portion of a data unit and may be used to mitigate ISI, which may result from a communication channel having multiple signal paths of different propagation delays. The techniques may be used for different types of communication systems including cellular systems, wireless local area network (WLAN) systems, broadcast systems, satellite systems, etc. The terms "system" and "network" are often used interchangeably.

Figure 1:
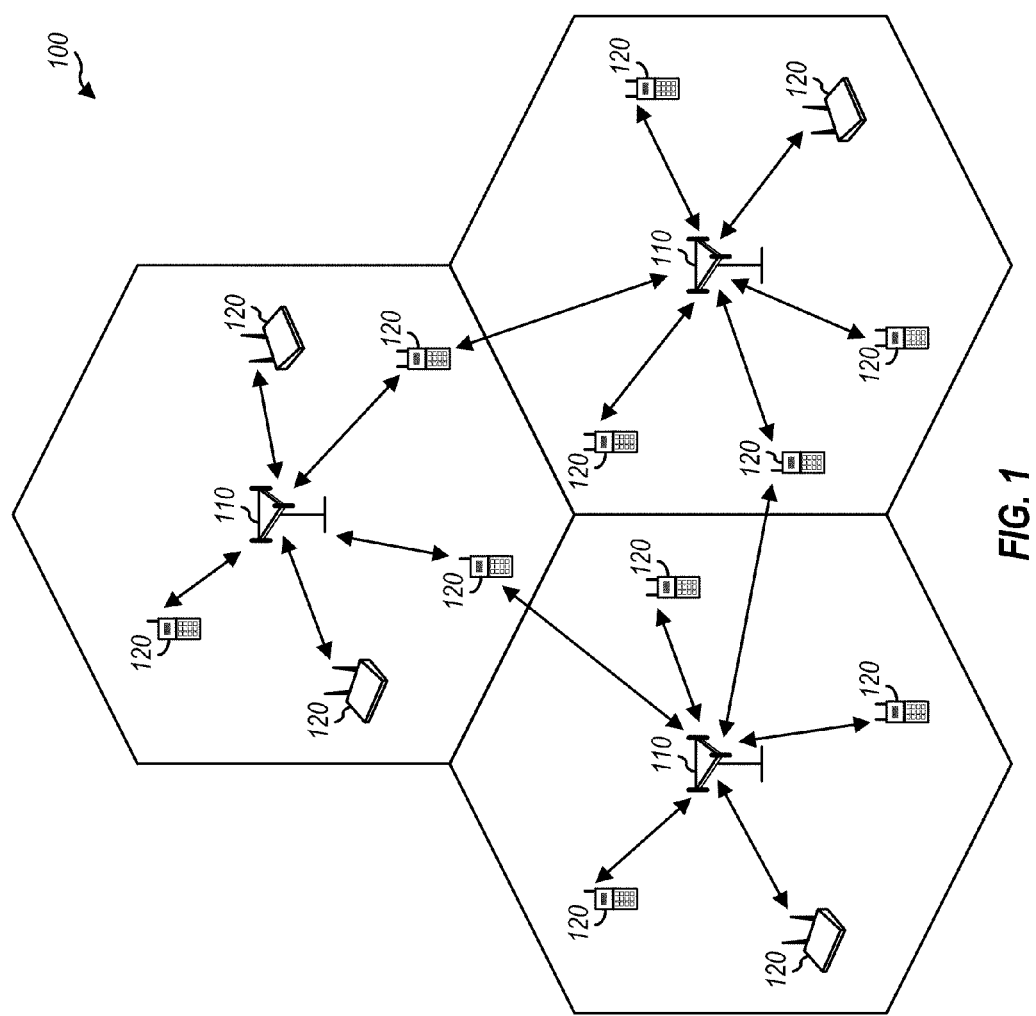
FIG. 1 shows a wireless communication system.

FIG. 1 shows a wireless communication system 100, which may be a cellular system, a WLAN system, a broadcast system, etc. System 100 may include a number of base stations 110 and other network entities. A base station may be an entity that communicates with and/or transmits data to user equipments (UEs). A base station may also be referred to as a Node B, an evolved Node B (eNB), an access point, etc. Each base station may provide communication coverage for a particular geographic area and may support communication for UEs located within the coverage area. To improve system capacity, the overall coverage area of a base station may be partitioned into multiple (e.g., three) smaller areas. Each smaller area may be served by a respective base station subsystem. The term "cell" can refer to the smallest coverage area of a base station and/or a base station subsystem serving this coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a broadcast receiver, a satellite receiver, etc.

The techniques described herein may be used for various cellular systems such as Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may also be used for WLAN systems. A WLAN system may implement a radio technology such as IEEE 802.11 (Wi-Fi), Hiperlan, etc. The techniques may also be used for broadcast systems. A broadcast system may implement a radio technology such as MediaFLO™, Digital Video Broadcasting for Handhelds (DVB-H), Integrated Services Digital Broadcasting for Terrestrial Television Broadcasting (ISDB-T), etc. The techniques may also be used for other systems and radio technologies. For clarity, certain aspects of the techniques are described below for LTE.

LTE utilizes OFDM on the downlink and SC-FDM on the uplink. OFDM and SC-FDM partition a frequency range into multiple (N) orthogonal subcarriers, which are also commonly referred to as tones, bins, etc. Each subcarrier may be modulated with data. In general, modulation symbols are transmitted in the frequency domain with OFDM and in the time domain with SC-FDM. The spacing between adjacent subcarriers may be fixed, and the total number of subcarriers (N) may be dependent on the system bandwidth. For example, the subcarrier spacing may be 15 kilohertz (KHz), and N may be equal to 128, 256, 512, 1024 or 2048 for system bandwidth of 1.25, 2.5, 5, 10 or 20 megahertz (MHz), respectively.

Figure 2:
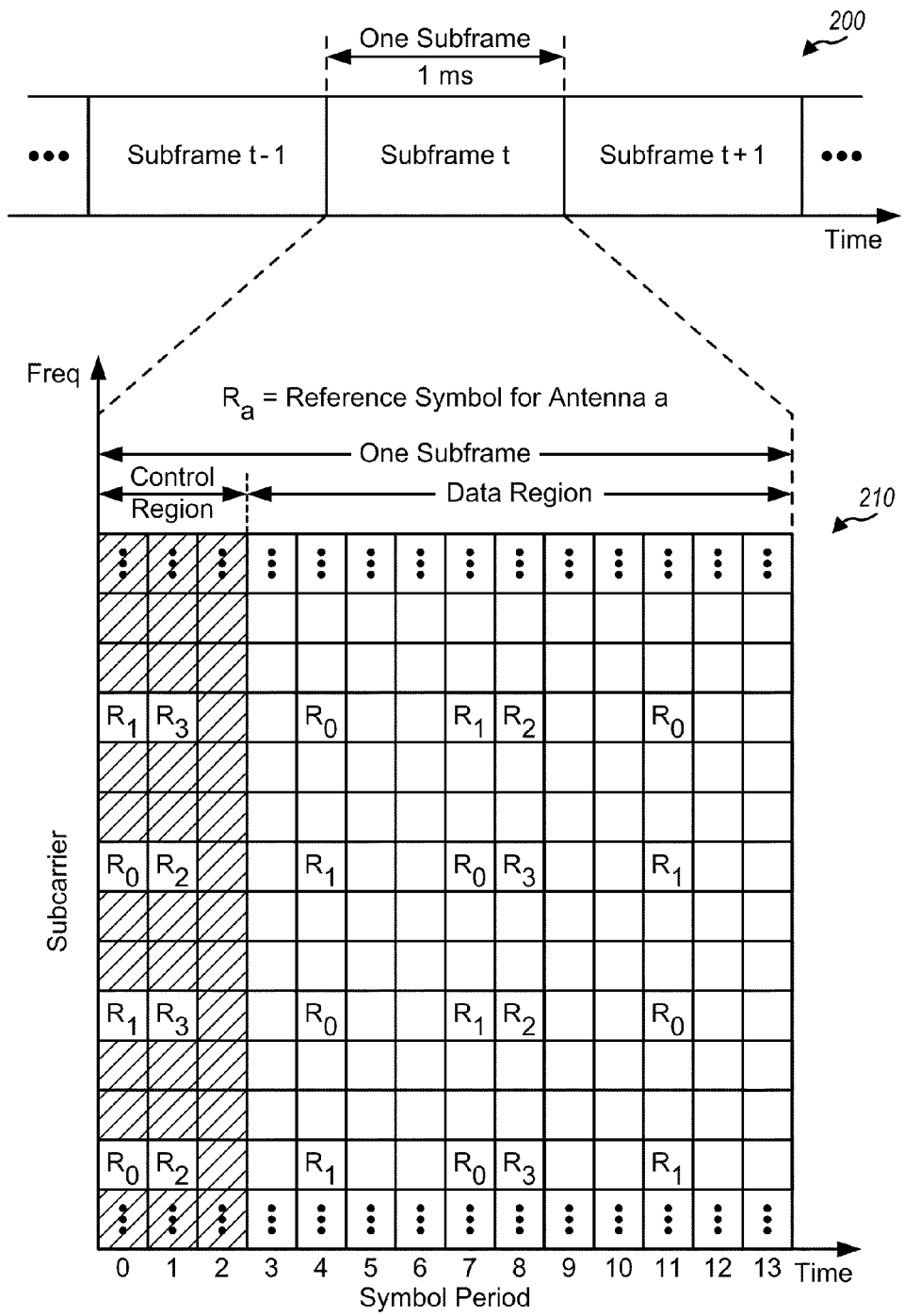
FIG. 2 shows an exemplary frame structure.

FIG. 2 shows a frame structure 200 used in LTE. The transmission timeline for each of the downlink and uplink may be partitioned into units of subframes. Each subframe may have a predetermined duration (e.g., 1 milliseconds (ms)) and may include two slots. Each slot may include seven symbol periods for a normal cyclic prefix or six symbol periods for an extended cyclic prefix. On the downlink, an OFDM symbol may be transmitted in each symbol period of a subframe. On the uplink, an SC-FDM symbol may be transmitted in each symbol period of a subframe.

FIG. 2 also shows an exemplary subframe format 210 for the downlink with the normal cyclic prefix. Subframe format 210 may be used for a base station equipped with four antennas. A cell-specific reference signal (CRS) may be transmitted from antennas 0 and 1 in symbol periods 0, 4, 7 and 11 and from antennas 2 and 3 in symbol periods 1 and 8. A reference signal is a signal that is known a priori by a transmitter and a receiver and may also be referred to as pilot. A CRS is a reference signal that is specific for a cell, e.g., generated based on a cell identity (ID). In FIG. 2, for a given resource element with label $R_a$, a reference symbol may be transmitted on that resource element from antenna a, and no symbols may be transmitted on that resource element from other antennas. Resource elements not used for the CRS may be used to transmit data and/or control information. As shown in FIG. 2, reference symbols for the CRS may be transmitted from each antenna on every sixth subcarrier in a given symbol period. The CRS may also be transmitted from each antenna on staggered subcarriers in different symbol periods.

Figure 3:
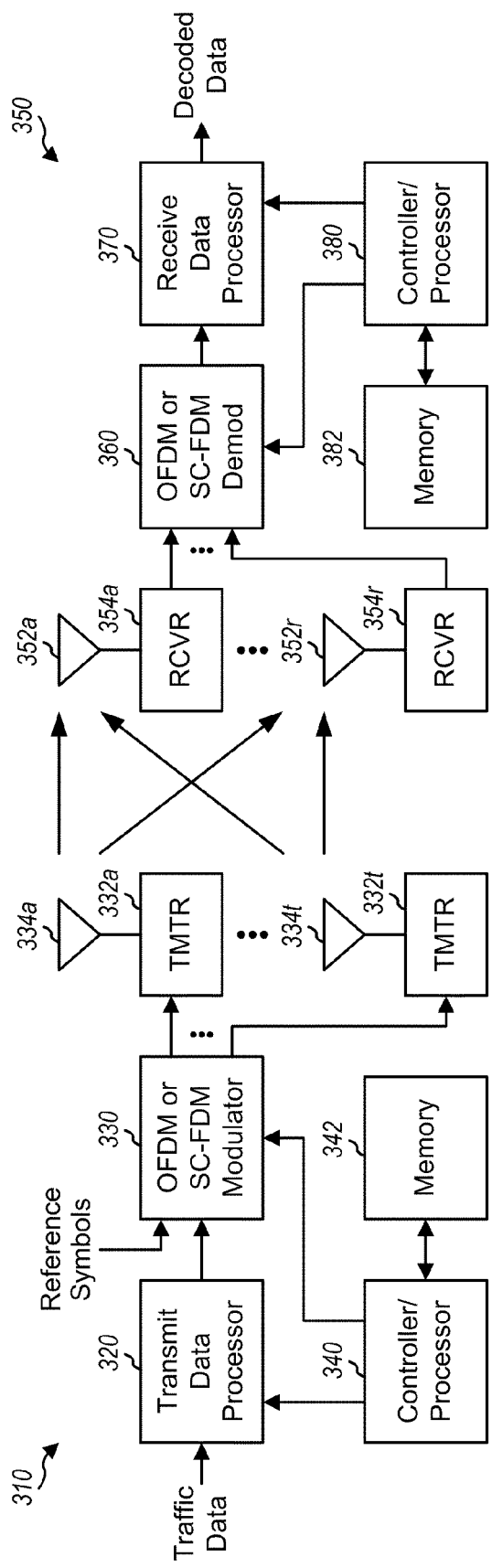
FIG. 3 shows a block diagram of a transmitter and a receiver.

FIG. 3 shows a block diagram of a design of a transmitter 310 and a receiver 350 in a communication system. For data transmission on the downlink, transmitter 310 may be part of a base station in FIG. 1, and receiver 350 may be part of a UE. For data transmission on the uplink, transmitter 310 may be part of a UE, and receiver 350 may be part of a base station. Transmitter may be equipped with T transmit antennas 334a through 334t, and receiver 350 may be equipped with R receive antennas 352a through 352r, where in general $T \geq 1$ and $R \geq 1$.

At transmitter 310, a transmit data processor 320 may process (e.g., encode, interleave, and symbol map) traffic data and/or control data and may provide data symbols. As used herein, a data symbol may be a modulation symbol for data, a reference symbol may be a modulation symbol for a reference signal or pilot, a zero symbol may be a signal value of zero, and a modulation symbol may be a real or complex value. Processor 320 may also perform precoding (if applicable). An OFDM or SC-FDM modulator 330 may receive the data symbols and reference symbols and may perform OFDM modulation or SC-FDM modulation on the data symbols and reference symbols. Modulator 330 may provide OFDM symbols or SC-FDM symbols to transmitter units (TMTR) 332a through 332t. Each transmitter unit 332 may receive and process (e.g., convert to analog, amplify, filter, and frequency upconvert) its OFDM symbols or SC-FDM symbols and may generate a modulated signal, which may be transmitted via an associated antenna 334 to receiver 350.

At receiver 350, antennas 352a through 352r may receive the T modulated signals from transmitter 310, and each antenna 352 may provide a received signal to an associated receiver unit (RCVR) 354. Each receiver unit 354 may condition (e.g., filter, amplify, frequency downconvert, and digitize) its received signal and provide received samples. An OFDM or SC-FDM demodulator (Demod) 360 may process the received samples from all receiver units 352 as described below and provide N received symbols for the N total subcarriers in each symbol period for each receive antenna. The received symbols may include received data symbols from subcarriers used to transmit data (or data subcarriers) and received reference symbols from subcarriers used to transmit reference signals (or pilot subcarriers). Demodulator 360 may perform time tracking to properly place an FFT window in each symbol period. Demodulator 360 may derive a channel estimate based on the received reference symbols. Demodulator 360 may also perform data demodulation/detection on the received data symbols with the channel estimate to obtain data symbol estimates, which are estimates of the data symbols transmitted by transmitter 310. A receive data processor 370 may process (e.g., symbol demap, deinterleave, and decode) the data symbol estimates and provide decoded data. In general, the processing by demodulator 360 and receive data processor 370 may be complementary to the processing by modulator 330 and transmit data processor 320, respectively.

Controllers/processors 340 and 380 may control the operation of various units at transmitter 310 and receiver 350, respectively. Memories 342 and 382 may store data and program codes for transmitter 310 and receiver 350, respectively.

Figure 4:
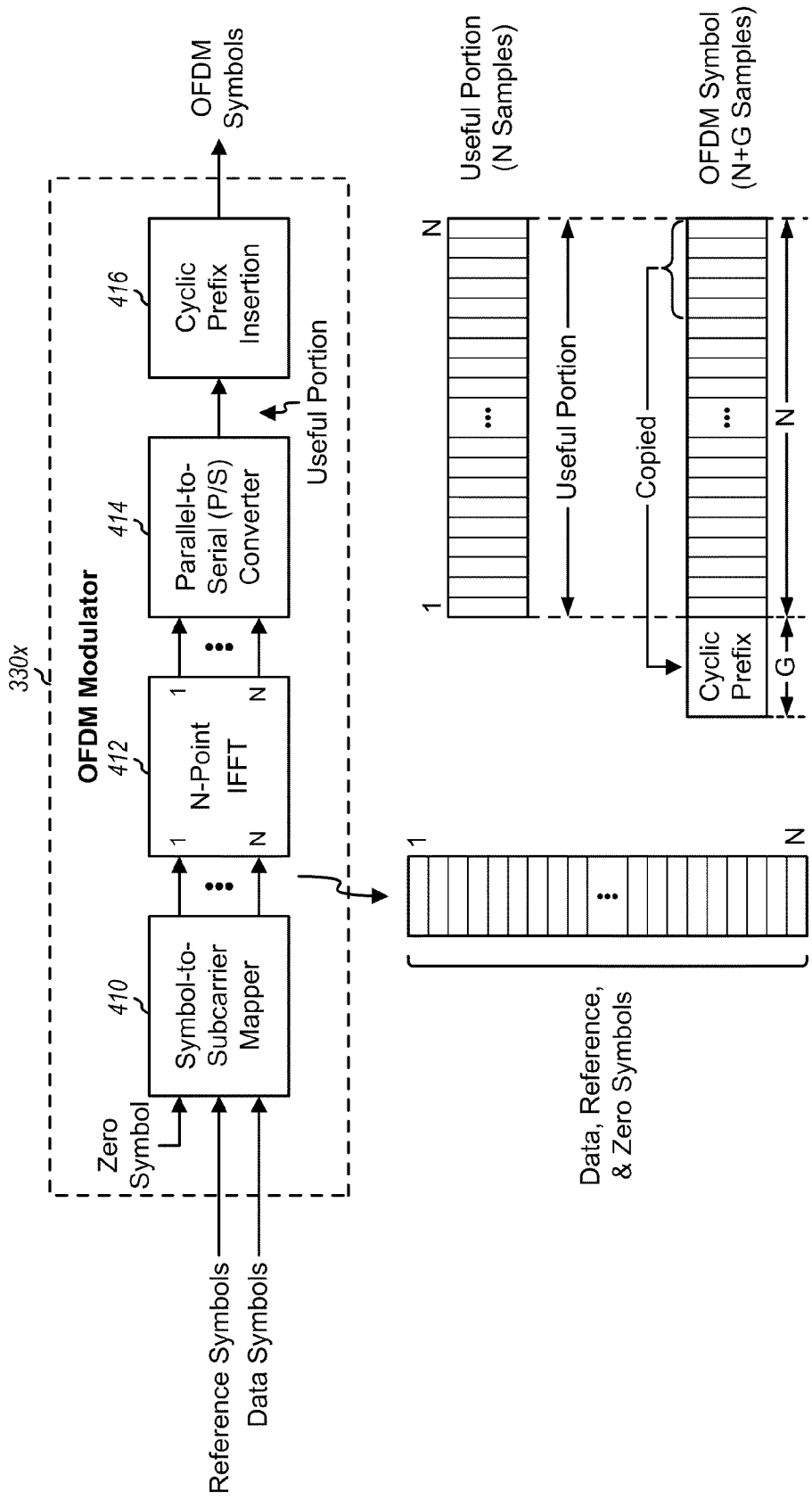
FIG. 4 shows a block diagram of an OFDM modulator.

FIG. 4 shows a block diagram of an OFDM modulator 330x, which may be one design of modulator 330 at transmitter 310 in FIG. 3. Within OFDM modulator 330x, a symbol-to-subcarrier mapper 410 may receive and map data symbols and reference symbols to data and pilot subcarriers, respectively. Mapper 410 may also map zero symbols to unused subcarriers and may provide N mapped symbols for the N total subcarriers in each symbol period. A unit 412 may transform the N mapped symbols to the time domain with an N-point inverse FFT (IFFT) and may provide N time-domain samples. Each sample may be a complex value to be transmitted in one sample period. A parallel-to-serial (P/S) converter 414 may serialize the N samples and provide a useful portion of an OFDM symbol. A cyclic prefix insertion unit 416 may copy the last G samples of the useful portion and append the copied portion to the front of the useful portion to form an OFDM symbol comprising N+G samples. The cyclic prefix may also be referred to as a guard interval and may be used to combat ISI and ICI caused by delay spread in a communication channel. The length of the cyclic prefix (G) determines the largest delay spread that a receiver can tolerate without incurring ISI and ICI.

Figure 5:
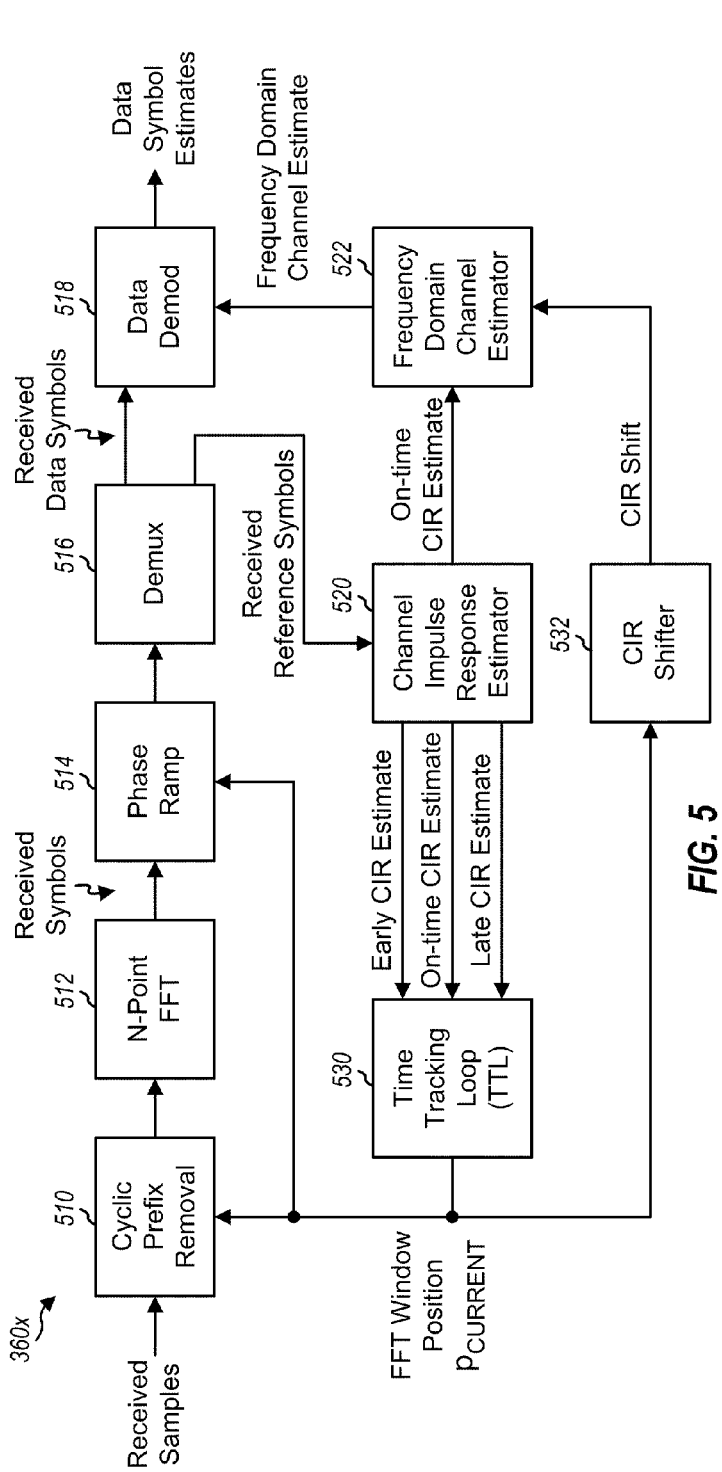
FIG. 5 shows a block diagram of an OFDM demodulator.

FIG. 5 shows a block diagram of a design of an OFDM demodulator 360x, which may be used for demodulator 360 at receiver 350 in FIG. 1. Demodulator 360x may obtain received samples from each receiver unit 354, which may perform automatic gain control (AGC), timing acquisition, filtering, sample rate conversion, direct current (DC) offset removal, frequency error estimation and removal, and/or other functions. Within demodulator 360x, a unit 510 may remove the cyclic prefix in each received OFDM symbol based on the current FFT window position $p_{CURRENT}$ from a time tracking loop (TTL) 530 and may provide N received samples for the received OFDM symbol. The FFT window position may control the placement of an FFT window for each received OFDM symbol. The FFT window may determine which N received samples to process from among the N+G received samples for the OFDM symbol.

For each received OFDM symbol, a unit 512 may perform an N-point FFT on the N received samples and may provide N frequency-domain received symbols for the N total subcarriers. A unit 514 may apply a phase ramp on the N received symbols in the frequency domain to account for adjustment of the FFT window position by TTL 530. A demultiplexer (Demux) 516 may obtain N symbols for the N total subcarriers from unit 514, provide received data symbols from the data subcarriers to a data demodulator 518, and provide received reference symbols (if any) from the pilot subcarriers to a CIR estimator 520. CIR estimator 520 may determine an M-tap on-time CIR estimate based on the received reference symbols in each OFDM symbol carrying the CRS, where M may be any suitable value. CIR estimator 520 may also obtain the received samples and may determine early and late CIR estimates, as described below. The on-time CIR estimate may be derived based on on-time received samples selected by the current FFT window position. The early CIR estimate may be derived based on early received samples selected by an early FFT window position. The late CIR estimate may be derived based on late received samples selected by a late FFT window position.

TTL 530 may receive the on-time, early, and late CIR estimates from CIR estimator 520 and may update the FFT window position, as described below. A unit 532 may determine a shift in the CIR of a wireless channel from transmitter 310 to receiver 350 based on the FFT window position and may provide a CIR shift. A unit 522 may receive the on-time CIR estimate from CIR estimator 520 and the CIR shift from unit 532. Unit 522 may derive a frequency-domain channel frequency response (CFR) estimate based on the on-time CIR estimate and may also perform processing to account for any shift in the FFT window position, as indicated by the CIR shift from unit 532. The on-time CFR estimate may include a complex channel gain for each sub carrier of interest.

Data demodulator 518 may perform data demodulation/detection on the received data symbols with the CFR estimate and may provide data symbol estimates. Although not shown in FIG. 5 for simplicity, OFDM demodulator 360x may also include processing units for frame detection, frame synchronization, frequency tracking, and/or other functions.

Figure 6:
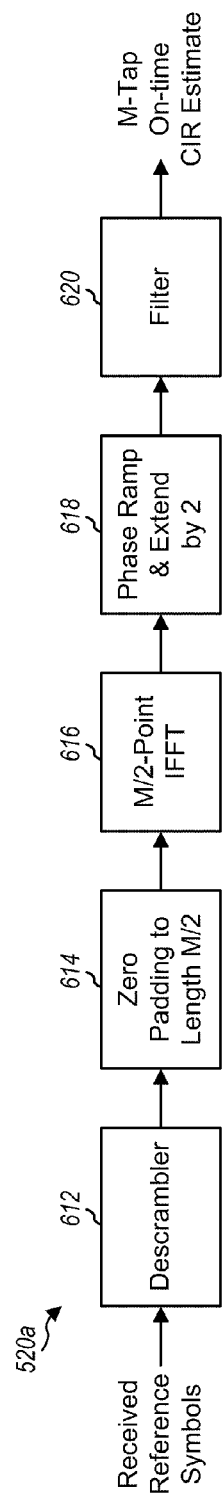
FIG. 6 shows a design of a CIR estimator.

FIG. 6 shows a design of a CIR estimator 520a, which may be part of CIR estimator 520 in FIG. 5. For simplicity, the processing by CIR estimator 520a to derive an on-time CIR estimate for one antenna of transmitter 310 is described below. Within CIR estimator 520a, a descrambler 612 may obtain received reference symbols from the pilot subcarriers and may remove the modulation on the received reference symbols to obtain channel gains for the pilot subcarriers. For each transmit antenna, the pilot subcarriers may be spaced apart by six subcarriers in one symbol period and may be staggered by three subcarriers between symbol periods, as shown in FIG. 2. A unit 614 may receive the channel gains from descrambler 612 and may append a sufficient number of zeros to obtain M/2 channel gains and zeros, where M/2 may be the smallest power of two that is equal to or larger than the number of pilot subcarriers for one transmit antenna in one symbol period. A unit 616 may perform an M/2-point IFFT on the M/2 channel gains and zeros to obtain an initial CIR estimate comprising M/2 channel taps. A unit 618 may extend the initial CIR estimate by a factor of two and may apply a phase ramp determined based on a subcarrier offset for the pilot subcarriers across two consecutive OFDM symbols carrying the CRS.

In LTE, 2048 total subcarriers may be available for a system bandwidth of 20 MHz. However, only 1320 subcarriers may be used for transmission, and the remaining subcarriers may serve as guard band. A total of 220 pilot subcarriers may be present among the 1320 used subcarriers. A total of 220 channel gains may be obtained for the 220 pilot subcarriers and may be extended to a length of 256 by appending 36 zeros. A 256-point IFFT may then be performed on the 256 channel gains and zeros to obtain an initial CIR estimate comprising 256 channel taps. Unit 618 may perform interpolation to obtain a channel gain for every three subcarriers based on received reference symbols for every sixth subcarrier. Unit 618 may also apply a phase ramp on the channel gains in the time domain to account for the CRS being transmitted on staggered pilot subcarriers in different symbol periods.

A filter 620 may receive an extended CIR estimate from unit 618 for each received OFDM symbol comprising the CRS and may filter the extended CIR estimates across OFDM symbols. Filter 620 may provide an M-tap on-time CIR estimate, e.g., whenever an OFDM symbol comprising the CRS is received.

FIG. 6 shows a specific design of deriving a CIR estimate based on received reference symbols. A CIR estimate may also be derived in other manners. For example, in another design, the M/2 channel gains and zeros from unit 614 may be interpolated to obtain M interpolated channel gains. An M-point IFFT may then be performed on the M interpolated channel gains. De-staggering and compensation for frequency shift may thus be performed in the time domain (as shown in FIG. 6) or in the frequency domain.

In one design, CIR estimates may be derived for each transmit antenna based on the CRS received from that antenna. In another design, CIR estimates may be averaged across transmit antennas to obtain an overall CIR estimate for all transmit antennas. CIR estimates for multiple transmit antennas may also be derived in other manners.

Transmitter 310 may transmit a modulated signal from each transmit antenna 334. Receiver 350 may receive each modulated signal via a number of signal paths at each receive antenna 352. Each signal path may be associated with a particular complex gain and a particular propagation delay. The number of signal paths as well as the gain and delay of each signal path may be dependent on the propagation environment.

FIG. 7A shows an exemplary CIR of a communication channel from one transmit antenna to one receive antenna. The CIR may include M channel taps at M different delays. The channel tap at delay m, where $0 \leq m < M$, may be associated with a signal path having a complex gain of $h_m$ and a propagation delay of m. In general, the gain $h_m$ of each channel tap may be zero or non-zero. The delay spread of the communication channel is the difference between the propagation delay of the first arriving path (FAP) and the propagation delay of the last arriving path (LAP).

FIG. 7B shows an exemplary transmission of an OFDM symbol from one transmit antenna via a communication channel with multiple signal paths. A receive antenna may receive a copy of the OFDM symbol via each signal path. Each OFDM symbol copy may be scaled by the complex gain of the associated signal path and may be further delayed by the propagation delay of that signal path. For simplicity, FIG. 7B shows only the first OFDM symbol copy received via the FAP and the last OFDM symbol copy received via the LAP. The start of the last OFDM symbol copy is delayed by D samples relative to the start of the first OFDM symbol copy, where D is the delay spread of the communication channel. The received OFDM symbol is equal to a superposition of all of the OFDM symbol copies at the receive antenna.

FIG. 7B also shows the placement of an FFT window for the received OFDM symbol. The start of the FFT window is placed at position $p_{CURRENT}$, which is referred to as the FFT window position. $p_{CURRENT}$ may be a signed (+ or −) FFT window offset from the middle of the cyclic prefix and may be equal to 0 when the FFT window is placed at the middle of the cyclic prefix. The current FFT window has a width of N samples and determines which N received samples of the received OFDM symbol to select for subsequent processing and which G received samples to discard. If the delay spread is less than the cyclic prefix length (or D<G), which is the case in FIG. 7B, then the FFT window may be placed such that the start of the FFT window falls within the cyclic prefix of each of the OFDM symbol copies, as shown in FIG. 7B. The FFT window would then capture N samples of each OFDM symbol copy and no samples of preceding and subsequent OFDM symbols. This would then result in no ISI from adjacent OFDM symbols and also no ICI due to loss of orthogonality between the N subcarriers.

In general, an ISI/ICI-free region may be defined to be an overlapping region of the cyclic prefixes of all OFDM symbol copies at receiver 350. If the FFT window position is within the ISI/ICI-free region, then the proper N samples would be selected for processing, and ISI and ICI may be avoided, which is desirable. The goal of time tracking is to maintain the FFT window position within the ISI/ICI-free region.

FIG. 8A shows an exemplary CIR of a communication channel from a transmit antenna to a receive antenna for a large delay spread exceeding the cyclic prefix length, or D>G. Excess delay spread may occur in a large cell with a large coverage area.

FIG. 8B shows an exemplary transmission of an OFDM symbol from a transmit antenna with a large delay spread. A receive antenna may receive a number of copies of the OFDM symbol via a number of signal paths. If the delay spread exceeds the cyclic prefix length, as shown in FIG. 8B, then it would not be possible to place the start of the FFT window within the cyclic prefix of each OFDM symbol copy. Hence, there will be some ISI and ICI due to energy from adjacent OFDM symbols.

TTL 530 in FIG. 5 may adjust the position of the FFT window so that good performance can be achieved for all channel conditions. TTL 530 may receive CIR estimates and may adjust the FFT window position based on the CIR estimates.

The design of a TTL for an OFDM or SC-FDM demodulator may be challenging for various reasons. First, when the delay spread is large, a CIR estimate may wrap around cyclically and alias, which may then result in uncertainty regarding the true FAP and the true LAP in the CIR estimate. The maximum CIR length that can be resolved without aliasing may be determined by the spacing of the pilot subcarriers. If the pilot subcarriers occur every third subcarrier as shown in FIG. 2, then the CIR length that can be resolved without aliasing is $T_{SYMBOL}/3$, where $T_{SYMBOL}$ is the duration of the useful portion of one OFDM symbol and may be 66.67 microseconds (μs) for 20 MHz system bandwidth in LTE. A large delay spread may exceed the resolvable range of the CIR and may result in aliasing of the CIR estimate. Ambiguity in the FAP and LAP due to aliasing may significantly degrade the performance of the TTL. Furthermore, new signal paths may be born and old signal paths may vanish, thereby resulting in new FAP and/or new LAP that should be tracked. Second, placement of the FFT window to obtain the best possible performance may be challenging when the delay spread exceeds the cyclic prefix length and some ISI and ICI are inevitable.

In an aspect, time tracking may be performed with a TTL comprising an inner TTL and an outer TTL. The outer TTL may have a wider range of operation but may adjust the receiver timing (e.g., the FFT window position) in coarse steps. The inner TTL may have a more narrow range of operation but may adjust the receiver timing in fine steps. The outer TTL can resolve ambiguity between the FAP and LAP even when the delay spread is large and exceeds the cyclic prefix length. The inner TTL can more accurately adjust the receiver timing based on the reliably known FAP and LAP from the outer TTL. The outer TTL may also be referred to as a coarse TTL, and the inner TTL may also be referred to as a fine TTL.

Figure 9:
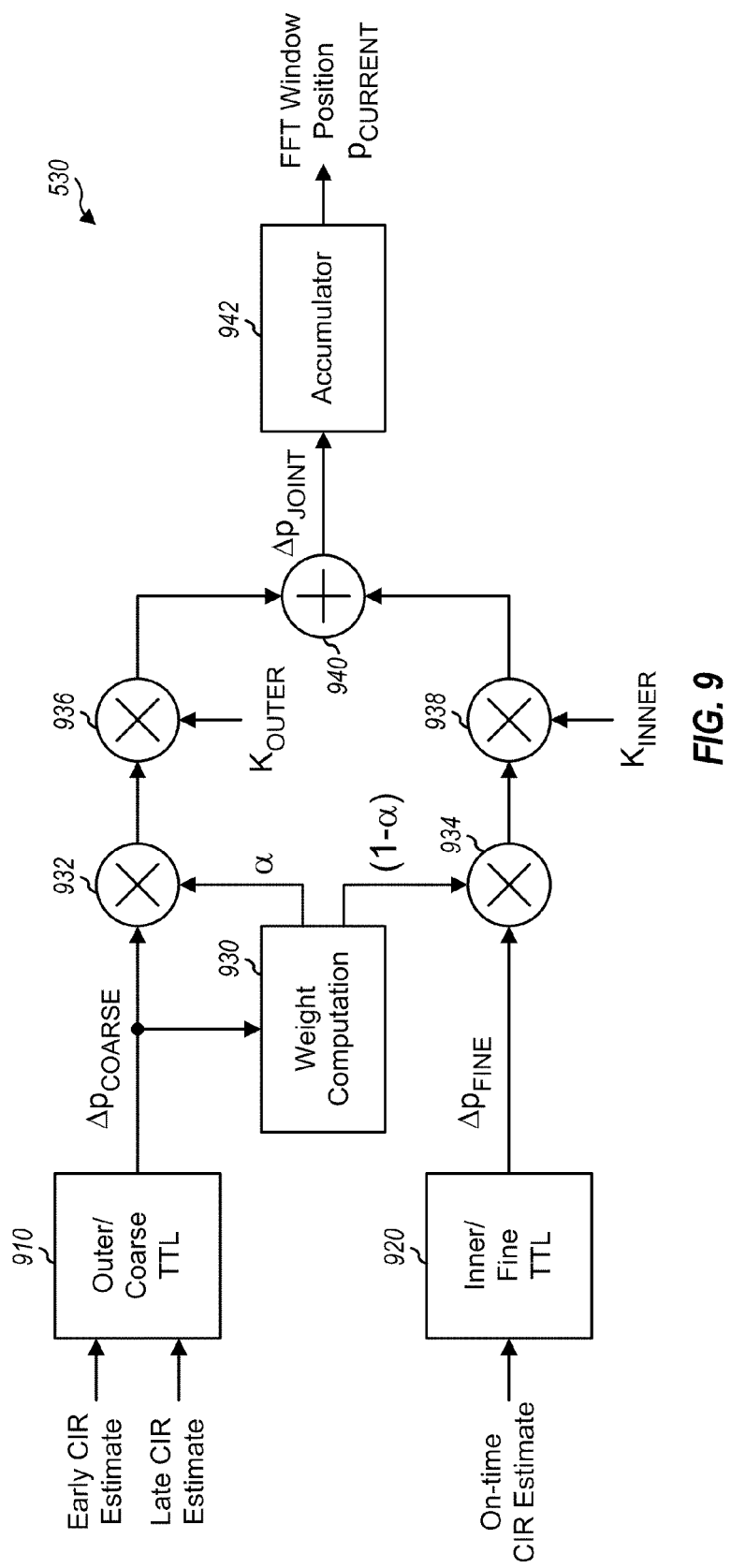
FIG. 9 shows a block diagram of a TTL with an inner TTL and an outer TTL.

FIG. 9 shows a block diagram of a design of TTL 530 in FIG. 5. Within TTL 530, an outer/coarse TTL 910 may receive early and late CIR estimates and may determine a coarse update $\Delta p_{COARSE}$ for the FFT window position based on the CIR estimates, as described below. An inner/fine TTL 920 may receive an on-time CIR estimate and may determine a fine update $\Delta p_{FINE}$ for the FFT window position based on the on-time CIR estimate, as also described below. Inner TTL 920 may assume that the on-time CIR estimate is not aliased and that there is no FAP/LAP ambiguity due to outer TTL 910. A unit 930 may determine a first weight α for the coarse update and a second weight (1−α) for the fine update based on the coarse update. The coarse update may be scaled with the first weight by a multiplier 932 and further multiplied with a first loop gain $K_{OUTER}$ by a multiplier 936. Similarly, the fine update may be scaled with the second weight by a multiplier 934 and further multiplied with a second loop gain $K_{INNER}$ by a multiplier 938. A summer 940 may sum the outputs of multipliers 936 and 938 and may provide a joint/overall update $\Delta p_{JOINT}$ for both the inner and outer TTLs. An accumulator 942 may accumulate the joint update and provide the FFT window position $p_{CURRENT}$.

In the design shown in FIG. 9, outer TTL 910 and inner TTL 920 may operate independently based on their CIR estimates. The coarse and fine updates from TTLs 910 and 920 may be combined to obtain the overall update. The first and second weights may be defined to give appropriate weight to the coarse and fine updates, as described below. For example, the coarse update may be given more weight when the FFT window is offset by a large amount and may be give less (or no) weight when the FFT window is near the desired position. Correspondingly, the fine update may be given more weight when the FFT window is near the desired position and may be give less (or no) weight when the FFT window is offset by a large amount. In general, large timing corrections may be made by outer TTL 910 while fine timing corrections may be made by inner TTL 920.

In another aspect, inner TTL 920 may perform fine time tracking and may adjust the FFT window position to maximize received signal quality, which may provide good data demodulation performance. Received signal quality may be quantified by a carrier-to-interference-plus-noise ratio (CINR), a carrier-to-noise ratio (C/N), a signal-to-interference-plus-noise ratio (SINR), a signal-to-noise ratio (SNR), etc. For simplicity, CINR is used in much of the description below. When the delay spread is smaller than the cyclic prefix length (e.g., as shown in FIG. 7B), the FFT window should start within the cyclic prefix in order to avoid ICI and ISI. However, when the delay spread exceeds the cyclic prefix length (e.g., as shown in FIG. 8B), there may be both (i) ISI from a previous OFDM symbol and/or a subsequent OFDM symbol and (ii) ICI due to loss of orthogonality of the subcarriers. Under such a scenario with excessive delay spread, the FFT window may be placed as a function of the channel taps so that CINR can be maximized.

For simplicity, much of the description below is for a single receive antenna at receiver 350. The results may be generalized to any number of receive antennas. A CIR estimate may include M channel taps, with the m-th channel tap having a complex gain of $h_m$ and a delay of m sample periods, where m=0, . . . , M−1. The M channel taps may be denoted as $\{h_0, h_1, \ldots h_{M-1}\}$. In general, $h_m$ may be a non-zero value when a signal path with delay m is present or may be a zero value otherwise.

A CINR may be computed based on a CIR estimate for a given FFT window position p, as follows:

$$CINR(p) = \frac{\sum_{m=0}^{M-1} |h_m|^2 - \text{Power}_{ISI,ICI}(p)}{\text{Power}_{ISI,ICI}(p) + \delta_n^2}, \quad \text{Eq (1)}$$

$$\text{Power}_{ISI,ICI}(p) = \text{Power}_{ISI}(p) + \text{Power}_{ICI}(p), \quad \text{Eq (2)}$$

$$\text{Power}_{ISI}(p) = \sum_{m=0}^{m<p} a_m \cdot |h_m|^2 + \sum_{m>p+G}^{M-1} b_m \cdot |h_m|^2, \quad \text{Eq (3)}$$

$$\text{Power}_{ICI}(p) = \sum_{m=0}^{m<p} (a_m - a_m^2) \cdot |h_m|^2 + \sum_{m>p+G}^{M-1} (b_m - b_m^2) \cdot |h_m|^2, \quad \text{Eq (4)}$$

$$a_m = \frac{p-m}{N}, \quad \text{Eq (5)}$$

$$b_m = \frac{m-G-p}{N}, \quad \text{Eq (6)}$$

where $\text{Power}_{ISI,ICI}(p)$ is the power of both ISI and ICI for FFT window position p, $\text{Power}_{ISI}(p)$ is the power of ISI for FFT window position p, $\text{Power}_{ICI}(p)$ is the power of ICI for FFT window position p, $\delta_n^2$ is the variance of noise, and CINR(p) is the CINR for FFT window position p.

The CINR may be computed for different possible FFT window positions, e.g., from p=−(N−1) to (N−1). The FFT window position associated with the highest CINR may then be selected as the FFT window position to use. However, the computation in equations (1) to (4) may be complex, and it may be difficult to perform the computation in real-time in each symbol period in which the CRS is transmitted.

The FFT window position may be updated with inner TTL 920 to achieve similar performance as equations (1) to (4), albeit with much less computation. It can be shown that CINR(p) is a monotonically decreasing function of $\text{Power}_{ISI,ICI}(p)$. Therefore, the desired FFT window position (which can provide the highest CINR) may be obtained by either maximizing the numerator of equation (1) with respect to p or minimizing the denominator of equation (1) with respect to p. This may be equivalent to minimizing $\text{Power}_{ISI,ICI}(p)$ with respect to p.

A continuous-time version of $\text{Power}_{ISI,ICI}(p)$ may be denoted as T(p). T(p) may be considered as a metric for ISI plus ICI and may have a length of N (with zero padding as needed). To update the FFT window position, the first derivative of T(p) may be taken with respect to p and may be set to zero. The FFT window position may then be updated as follows:

$$p_{NEW} = p_{CURRENT} - \frac{T'(p_{CURRENT})}{T''(p_{CURRENT})}, \quad \text{Eq (7)}$$

where $p_{CURRENT}$ is the current FFT window position, $p_{NEW}$ is the new/updated FFT window position, $T'(p_{CURRENT})$ is the first derivative of T(p) evaluated at $p_{CURRENT}$, and $T''(p_{CURRENT})$ is the second derivative of T(p) evaluated at $p_{CURRENT}$.

$p_{CURRENT}$ is the FFT window position for the current time interval and may be expressed as $p_{CURRENT}=p(t)$, where t is an index for time interval. $p_{NEW}$ is the FFT window position for the next time interval and may be expressed as $p_{NEW}=p(t+1)$. Equation (7) assumes that T(p) can be approximated with a Taylor series expansion up to the second order in the vicinity of the current FFT window position. The first derivative of T(p) evaluated at the current FFT window position may be expressed as:

$$T'(p_{CURRENT}) = \frac{2}{N} \cdot (T_{EARLY} - T_{LATE}), \quad \text{Eq (8)}$$

$$T_{EARLY} = \sum_{m=0}^{m<p_{CURRENT}-G/2} q_m \cdot |h_m|^2, \quad \text{Eq (9)}$$

$$T_{LATE} = \sum_{m=p_{CURRENT}+G/2}^{m<N} q_m \cdot |h_m|^2, \quad \text{Eq (10)}$$

$$q_m = \begin{cases} 1 - \dfrac{p_{CURRENT} - \dfrac{G}{2} - m}{N} & \text{for } m = 0 \text{ to } p_{CURRENT} - \dfrac{G}{2} \\ 1 - \dfrac{m - p_{CURRENT} - \dfrac{G}{2}}{N} & \text{for } m = p_{CURRENT} + \dfrac{G}{2} \text{ to } N \end{cases} \quad \text{Eq (11)}$$

where $T_{EARLY}$ is related to interference caused by a subsequent OFDM symbol, $T_{LATE}$ is related to interference caused by a previous OFDM symbol, and $q_m$ is a weight used to compute $T_{EARLY}$ and $T_{LATE}$.

Figure 10A:
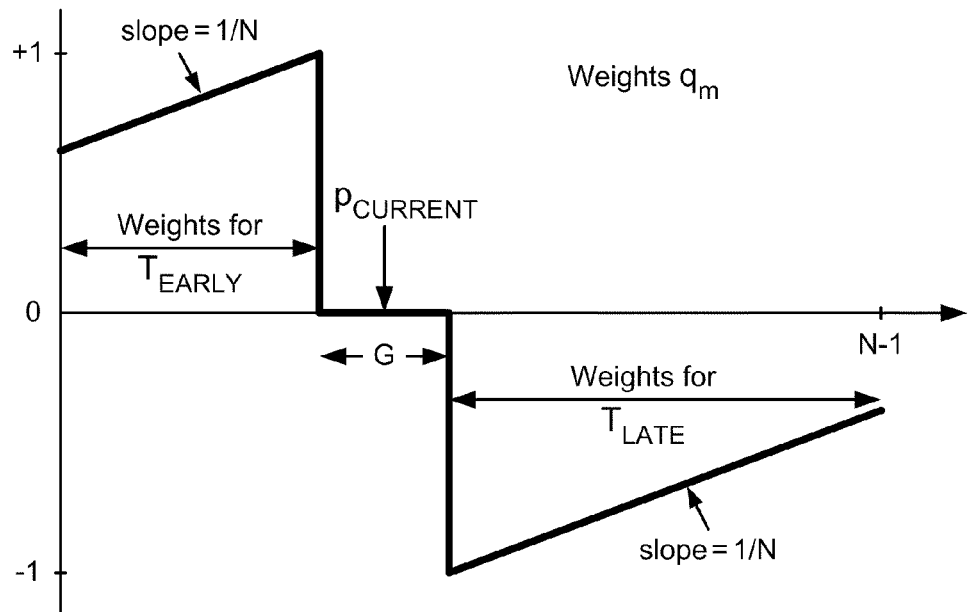
FIGS. 10A to 10D show plots of different weights for a metric of ISI and ICI.

FIG. 10A shows a plot of a design of weights $q_m$ defined in equation (11) and used in equations (9) and (10). In this design, weight $q_m$ linearly increases from m=0 to $p_{CURRENT}-G/2$, then abruptly drops to zero at $p_{CURRENT}-G/2$, then remains at zero for a duration of G, then abruptly drops to $-1$ at $m=p_{CURRENT}+G/2$, and then linearly increases until m=N-1. FIG. 10A shows $-q_m$ for m greater than $p_{CURRENT}$, which includes the minus sign for $T_{LATE}$ in equation (8).

The right hand side of equation (8) is the difference between $T_{EARLY}$ and $T_{LATE}$ and may be obtained as an inner product of channel tap energies $|h_0|^2$ through $|h_{N-1}|^2$ with weights $q_0$ through $q_{N-1}$, respectively. $T_{EARLY}$ is the weighted energy of the early signal paths whose delay is less than the current FFT window position minus half the cyclic prefix length. $T_{LATE}$ is the weighted energy of the late signal paths whose delay is greater than the current FFT window position plus half the cyclic prefix length. $T_{EARLY}$ and $T_{LATE}$ are defined with an assumption that the current FFT window position is located in the middle of the cyclic prefix.

Equations (7) and (8) indicate that if the weighted energy $T_{EARLY}$ of the early signal paths exceeds the weighted energy $T_{LATE}$ of the late signal paths, then the FFT window position should be shifted left (or earlier). Conversely, if the weighted energy of the early signal paths is less than the weighted energy of the late signal paths, then the FFT window position should be shifted right (or later). These observations assume that $T''(p_{CURRENT})$ exists and is positive, which may be true for most scenarios of interest.

In the design shown in FIG. 10A, the channel taps within the cyclic prefix are omitted in the computation of $T_{EARLY}$ and $T_{LATE}$ since they do not contribute to ISI or ICI. Weights $q_m$ may be defined such that the contribution of the early signal paths corresponds to ISI from the next OFDM symbol and associated ICI, while the contribution of the late signal paths corresponds to ISI from the previous OFDM symbol and associated ICI. Furthermore, weights $q_m$ may vary linearly with FFT window offset, as shown in FIG. 10A. When the weighted energy difference between the early signal paths and the late signal paths is negligible, the current FFT window position matches the desired (e.g., optimal) position. The operation of inner TTL 920 with early signal paths and late signal paths may thus resemble a conventional 'early-late' TTL. A major difference between inner TTL 920 and the early-late TTL is that inner TTL 920 takes into account channel taps for multiple signal paths (e.g., the entire CIR) instead of a single signal path.

The design in FIG. 10A may allow the FFT window position to move anywhere within the cyclic prefix. If the delay spread of the communication channel is less than the cyclic prefix length, then $T_{EARLY}$ in equation (9) and $T_{LATE}$ in equation (10) should both be zero, and the FFT window position may not be updated in equation (7). This may result in ambiguity regarding the FFT window position with respect to the CIR. This ambiguity may not degrade performance since ISI and ICI are not presence when the FFT window position is within the cyclic prefix. However, it may be desirable to stabilize convergence of the FFT window position in all scenarios.

Figure 10B:
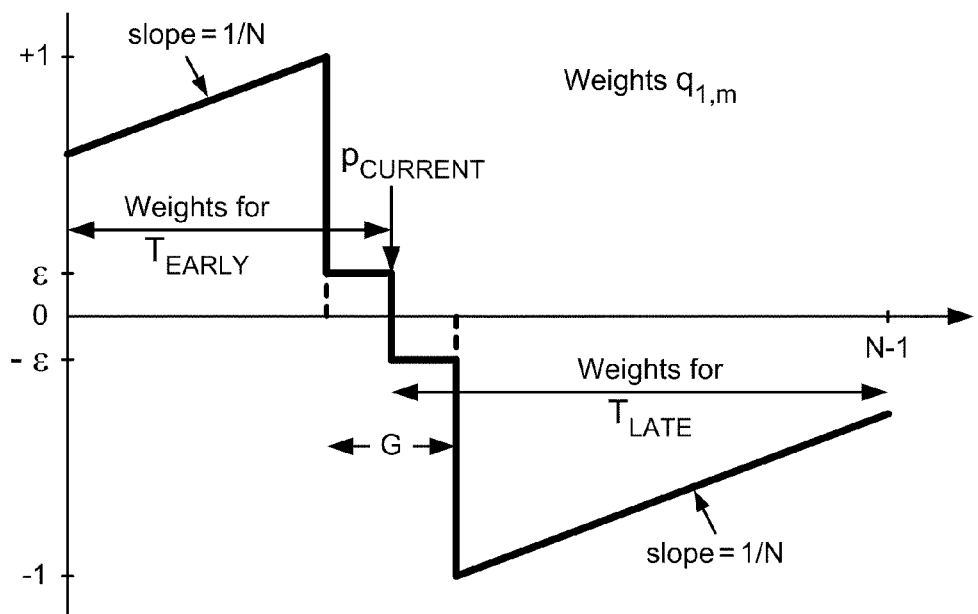

FIG. 10B shows a plot of a design of modified weights $q_{1,m}$ used to compute $T_{EARLY}$ and $T_{LATE}$. Weights $q_{1,m}$ match weights $q_m$ within a range from m=0 to $p_{CURRENT}-G/2$ and also within a range from $m=p_{CURRENT}+G/2$ to N-1. However, weights $q_{1,m}$ have (i) a small positive value of $\epsilon$ from $m=p_{CURRENT}-G/2$ to $p_{CURRENT}$ and (ii) a small negative value of $-\epsilon$ from $m=p_{CURRENT}$ to $p_{CURRENT}+G/2$.

The design in FIG. 10B assigns a small value to weights $q_{1,m}$ within the cyclic prefix. This would result in the FFT window being moved toward the middle of the cyclic prefix, even when only a single signal path is presence. $T_{EARLY}$ may be computed based on weights $q_{1,m}$ for m=0 to $p_{CURRENT}$. $T_{LATE}$ may be computed based on weights $q_{1,m}$ for $m=p_{CURRENT}+1$ to N-1.

Figure 10C:
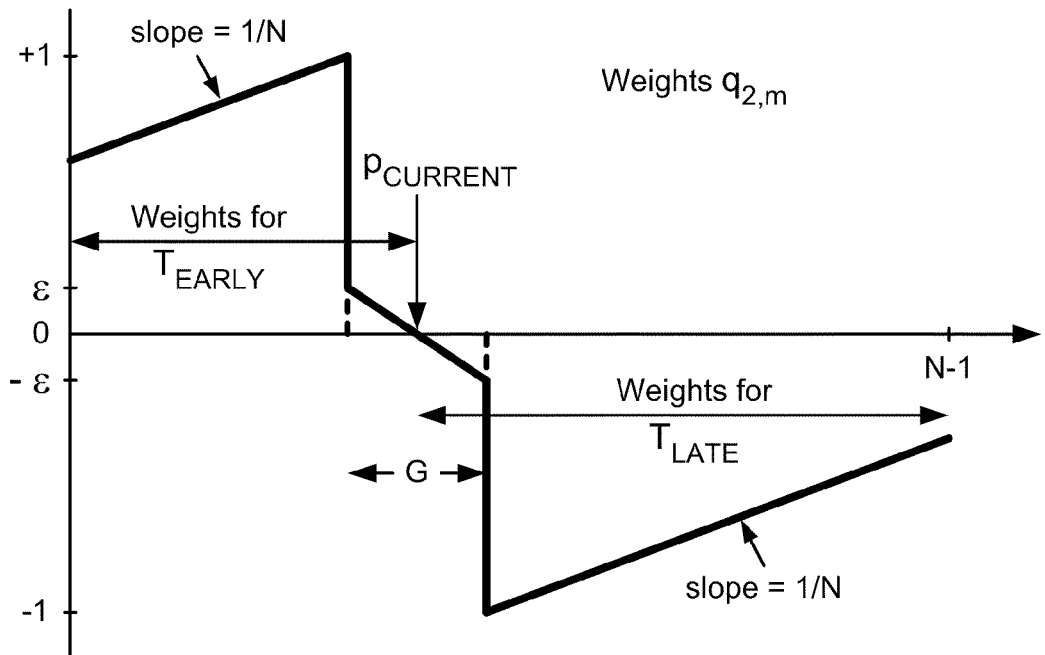

FIG. 10C shows a plot of another design of modified weights $q_{2,m}$ used to compute $T_{EARLY}$ and $T_{LATE}$. Weights $q_{2,m}$ match weights $q_m$ within the range from m=0 to $p_{CURRENT}$ and also within the range from $m=p_{CURRENT}+G/2$ to N-1. However, weights $q_{2,m}$ linearly decrease from a small positive value of $\epsilon$ at $m=p_{CURRENT}-G/2$ to a small negative value of $-\epsilon$ at $m=p_{CURRENT}+G/2$.

The design in FIG. 10C assigns a small value to weights $q_{2,m}$ within the cyclic prefix. A progressively larger value is assigned to weight $q_{2,m}$ at progressively further distance from the center of the cyclic prefix. This may result in the FFT window being moved toward the middle of the cyclic prefix with a progressively harder push for progressively further distance from the center of the cyclic prefix. $T_{EARLY}$ may be computed based on weights $q_{2,m}$ for m=0 to $p_{CURRENT}$. $T_{LATE}$ may be computed based on weights $q_{2,m}$ for $m=p_{CURRENT}+1$ to N−1.

The description above assumes a CIR estimate with a length of N, which is the FFT size. However, the CIR may be estimated using sub-sampled pilot subcarriers in the frequency domain, e.g., as shown in FIG. 2. As shown in FIG. 6, CIR estimation may be performed by descrambling received reference symbols and performing an M-point IFFT, where M may be dependent on the number of pilot subcarriers and may be smaller than N. Hence, the channel taps in the CIR estimate may not be spaced apart by the sample period of the received samples. For example, the sample rate may be 30.720 mega samples/second (Msps) for 20 MHz system bandwidth in LTE, the sample period may be $T_{SAMPLE}$=32.55 nano-seconds (ns), and the channel taps in the CIR estimate may be spaced apart by $T_{CIR}=4T_{SAMPLE}/3$ for the case in which M=512 for 440 total pilot subcarriers across symbol periods. In general, the spacing between channel taps may be given as $T_{CIR}=\eta \cdot T_{SAMPLE}$ and may be referred to as a tap period, where η may be dependent on the pilot sub-sampling, the IFFT size M, and the FFT size N. The weights (e.g., $q_{1,m}$ or $q_{2,m}$) may be applied to the channel taps in the CIR estimate whereas the FFT window may be shifted at the sample rate. Hence, a suitable conversion may be performed from one domain to the other domain.

Figure 10D:
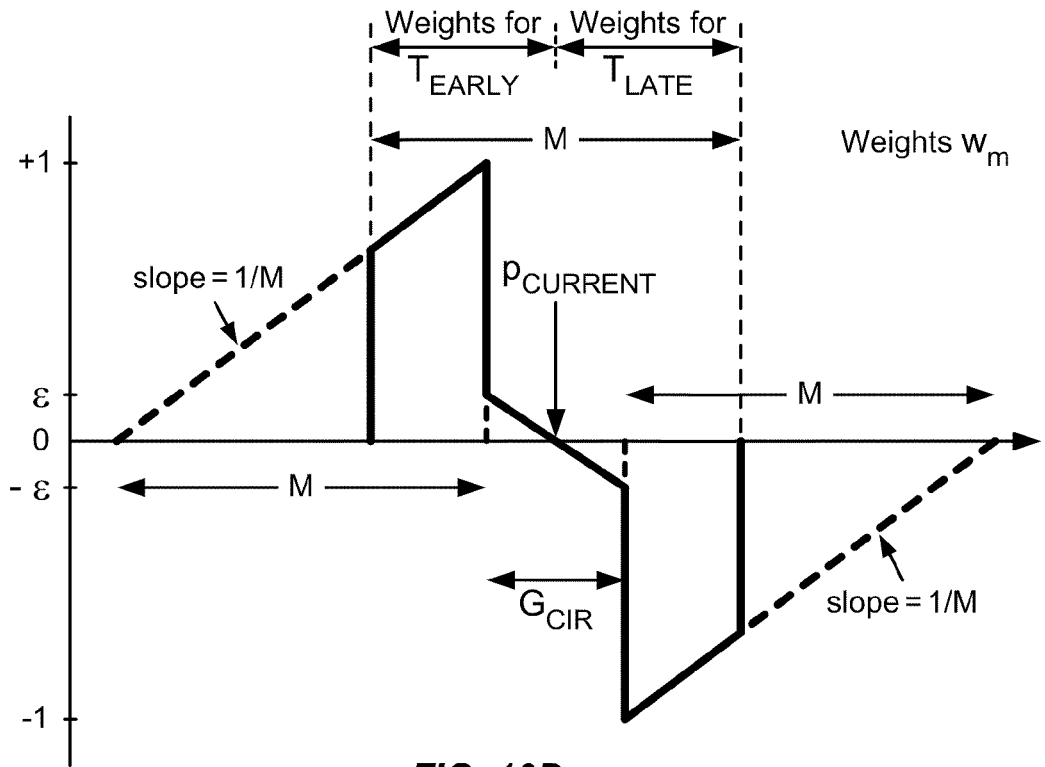

FIG. 10D shows a plot of a design of modified weights $w_m$, which are based on the channel tap sampling rate and may be used to compute $T_{EARLY}$ and $T_{LATE}$. Weights $w_m$ may be defined for M channel taps, which may be centered at the current FFT window position. The cyclic prefix may have a length of G sample periods or equivalently $G_{CIR}=G/\eta$ tap periods. Weights $w_m$ may linearly increase from 0 at $m=p_{CURRENT}-M-G_{CIR}/2$ to +1 at $p_{CURRENT}-G_{CIR}/2$ and may then abruptly drop to ε. Weights $w_m$ may then linearly decrease from ε at $p_{CURRENT}-G_{CIR}/2$ to −ε at $p_{CURRENT}+G_{CIR}/2$ and may then abruptly decrease to −1. Weights $w_m$ may then linearly increase from −1 at $p_{CURRENT}+G_{CIR}/2$ to 0 at $p_{CURRENT}+M+G_{CIR}/2$. Weights $w_m$ may be defined over a range of $2M+G_{CIR}$ tap periods, as shown in FIG. 10D. However, only M weights $w_m$ in the center M tap periods may be used for the M channel taps in the CIR estimate. The remaining weights would not be used and are shown by dashed lines in FIG. 10D.

Weight $w_m$ shown in FIG. 10D may be expressed as follows:

$$w_m = \begin{cases} \dfrac{p_{CURRENT}-m}{\dfrac{G_{CIR}}{2}} & \text{for } m = p_{CURRENT} - \dfrac{G_{CIR}}{2} \text{ to } p_{CURRENT} \\ \dfrac{p_{CURRENT}-m-1}{\dfrac{G_{CIR}}{2}} & \text{for } m = p_{CURRENT}+1 \text{ to } p_{CURRENT}+\dfrac{G_{CIR}}{2}-1 \end{cases} \quad \text{Eq (12)}$$

$$w_m = \begin{cases} 1-\eta\dfrac{p_{CURRENT}-\dfrac{G_{CIR}}{2}-m}{N} & \text{for } m = 0 \text{ to } p_{CURRENT}-\dfrac{G_{CIR}}{2}-1 \\ 1-\eta\dfrac{m-\dfrac{G_{CIR}}{2}-p_{CURRENT}}{N} & \text{for } m = p_{CURRENT}+\dfrac{G_{CIR}}{2} \text{ to } M-1 \end{cases} \quad \text{Eq (13)}$$

$T_{EARLY}$ and $T_{LATE}$ may be computed based on weight $w_m$ shown in FIG. 10D, as follows:

$$T_{EARLY} = \sum_{m=0}^{p_{CURRENT}-G_{CIR}/2-1} w_m \cdot |h_m|^2 + \sum_{m=p_{CURRENT}-G_{CIR}/2}^{p_{CURRENT}} \varepsilon \cdot w_m \cdot |h_m|^2, \quad \text{Eq (14)}$$

$$T_{LATE} = \sum_{m=p_{CURRENT}+G_{CIR}/2}^{M-1} w_m \cdot |h_m|^2 + \sum_{m=p_{CURRENT}+1}^{p_{CURRENT}+G_{CIR}/2-1} \varepsilon \cdot w_m \cdot |h_m|^2. \quad \text{Eq (15)}$$

A fine update for the FFT window position may be computed based on $T_{EARLY}$ and $T_{LATE}$, as follows:

$$\Delta p_{FINE} = \left(\dfrac{T_{LATE}-T_{EARLY}}{T_{LATE}+T_{EARLY}}\right) \cdot \Delta p_{FINE,MAX}, \quad \text{Eq (16)}$$

where $\Delta p_{FINE,MAX}$ is a maximum fine step size for updating the FFT window position by inner TTL 920, and $\Delta p_{FINE}$ is a fine update for the FFT window position from inner TTL 920.

The maximum fine step size $\Delta p_{FINE,MAX}$ may be selected so that inner TTL 920 can converge at the desired FFT window position without oscillating. The maximum fine step size should be sufficiently small so that $T_{EARLY}$ is equal to (or nearly equal to) $T_{LATE}$ near the desired FFT window position. In one design, the maximum fine step size may be a value within a range of 1 to 8, although other values may also be used.

Equation (16) shows a design of a discriminator for fine FFT 920. This discriminator uses a metric defined based on ISI and ICI to compute the fine update $\Delta p_{FINE}$. The metric comprises the quantity within parenthesis in equation (16) and is function of ISI and ICI. The entire right hand side of equation (16) may be referred to as a fine timing offset estimate or a fine timing discriminator.

The FFT window position may be updated based on the fine update, as follows:

$$p_{NEW}=p_{CURRENT}+\Delta p_{FINE}. \quad \text{Eq (17)}$$

In the design shown in equation (17), the new FFT window position may be equal to the current FFT window position plus the fine update, which may be determined based on $T_{EARLY}$ and $T_{LATE}$. Inner TTL 920 may converge when $T_{EARLY}$ and $T_{LATE}$ are approximately balanced. The three terms in equation (17) may be given in units of tap period. Referring back to FIG. 9, the FFT window position from accumulator 942 may be converted from units of tap period to units of sample period prior to being used to select received samples.

When G=0, $T_{EARLY}$ and $T_{LATE}$ may drive inner TTL 920 towards the center of mass of the CIR. When G≠0, $T_{EARLY}$ and $T_{LATE}$ may drive inner TTL 920 towards the desired (e.g., optimal) position that minimizes ISI plus ICI by taking into account the cyclic prefix. Inner TTL 920 may be initialized in various manners. For example, inner TTL 920 may be initialized to the origin or the center of mass of the CIR.

In equation (16), $T_{EARLY}-T_{LATE}$ is the scaled first derivative of the ISI+ICI metric T(p). Hence, the update in equation (16) may be closely related to the update based on the Taylor series in equation (7). The update in equation (17) does not use the second derivative and may be more stable than the update in equation (7).

Figure 11:
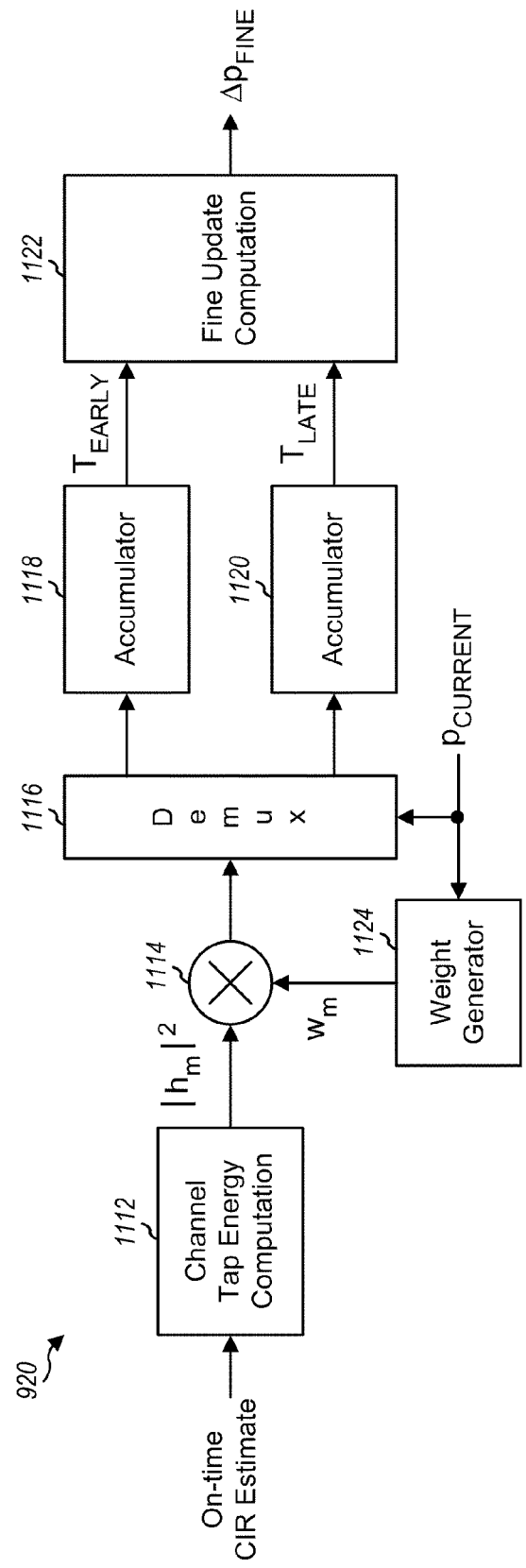
FIG. 11 shows a block diagram of an inner TTL.

FIG. 11 shows a block diagram of a design of inner TTL 920 in FIG. 9. Within inner TTL 920, a unit 1112 may receive an on-time CIR estimate comprising M channel taps and may compute the energy of each channel tap. A multiplier 1114 may scale the energy of each channel tap with a weight $w_m$ for that channel tap. A unit 1124 may receive the current FFT window position and may provide the weight $w_m$ for each channel tap, e.g., as shown in equations (12) and (13). A demultiplexer 1116 may provide (i) the scaled energies of channel taps for early signal paths to an accumulator 1118 and (ii) the scaled energies of channel taps for late signal paths to an accumulator 1120. Accumulator 1118 may sum the energies of all channel taps for the early signal paths and may provide $T_{EARLY}$. Similarly, accumulator 1120 may sum the energies of all channel taps for the late signal paths and may provide $T_{LATE}$.

A unit 1122 may receive $T_{EARLY}$ and $T_{LATE}$ and may compute a fine update $\Delta p_{FINE}$ for the FFT window position as shown in equation (16). In a design that is not shown in FIG. 11, an accumulator may receive and accumulate the fine update and provide the new FFT window position, as shown in equation (17). This design may be used to update the FFT window position based solely on inner TTL 920.

In yet another aspect, the FFT window position may be computed based on a CIR estimate directly without using a TTL. This may be referred to as one-shot computation of the FFT window position.

ISI and ICI may be a function of the FFT window position p, as shown in equations (3) and (4). In practical systems, the maximum delay spread is typically smaller than one third of the OFDM symbol length, so that m<N/3. In a tracking mode, the FFT window position offset is typically not larger than N/3. Hence, weights $a_m$ and $b_m$ in equations (3) to (6) may be small fractional values in typical scenarios. Consequently, the squared terms in equation (4) for ICI may be much smaller than the linear terms and may be omitted to form an equivalent metric, which may be an upper bound on the original metric. The equivalent metric may include the effect of both ISI and ICI and may be expressed as:

$$\text{Power}_{EQ,ISI,ICI}(p) = 2\sum_{m=0}^{m<p} a_m \cdot |h_m|^2 + 2\sum_{m>p+G}^{M-1} b_m \cdot |h_m|^2, \quad \text{Eq (18)}$$

where $\text{Power}_{EQ,ISI,ICI}(p)$ is the equivalent metric for ISI and ICI without considering the squared terms in equation (4). The metric in equation (18) is equal to twice $\text{Power}_{EQ,ISI,ICI}(p)$ in equation (3).

The desired FFT window position may be determined by (i) computing $\text{Power}_{EQ,ISI,ICI}(p)$ for each possible FFT window position p and (ii) selecting the position with the minimum value of $\text{Power}_{EQ,ISI,ICI}(p)$. This operation may be expressed in vector form as follows:

$$p_{NEW} = \arg\min_p c_p h, \quad \text{Eq (19)}$$

where h is a column vector containing the energies of the N channel taps, or $|h_n|^2$, of a CIR estimate and zero padded to length N, and $c_p$ is a row vector containing weights $a_m$ and $b_m$ and extended to length N.

Figure 12A:
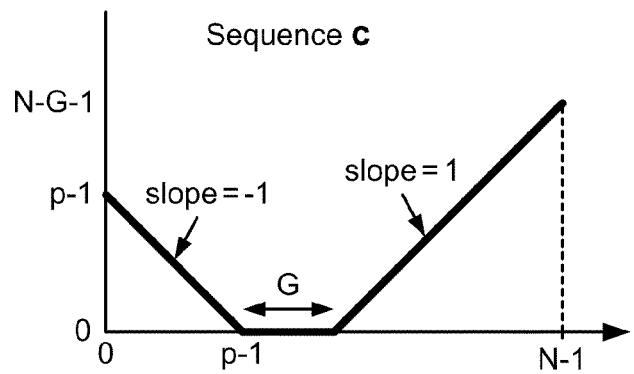
FIGS. 12A to 12E show plots of different weights for one-shot computation of FFT window position.

FIG. 12A shows a plot of the weights in vector $c_p$, which may be equal to $a_m$ for m<p and equal to $b_m$ for m>p+G. The weights in vector $c_p$ may be dependent on the value of p, and different sets of weights may be obtained for different values of p. Although $b_m$ is defined for m<M, the weights in vector $c_p$ may be extended to N−1. FIG. 12A shows p being non-negative.

Equation (19) may be equivalently expressed as follows:

$$p_{NEW} = \arg\max_p d_p h, \quad \text{Eq (20)}$$

where $d_p$ is a row vector containing weights $d_m$ defined as $d_m = N - G - c_m$. By using weights $d_m$ that are inversely related to weights $c_m$, the FFT window position p that maximizes (instead of minimizes) the argument may be selected.

Figure 12B:
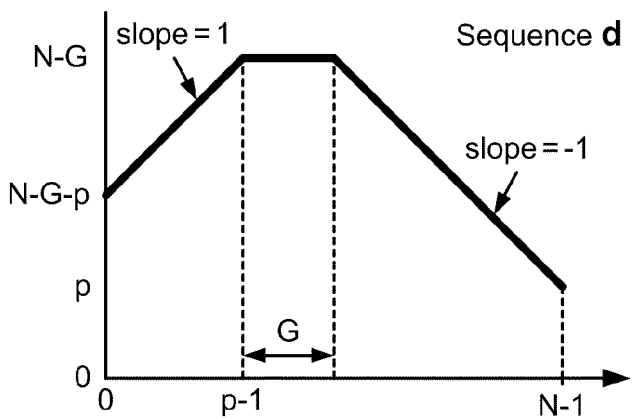

FIG. 12B shows a plot of the weights in vector $d_p$. The weights in vector $d_p$ are flipped about the horizontal axis and shifted up with respect to the weights in vector $c_p$ in FIG. 12A.

Figure 12C:
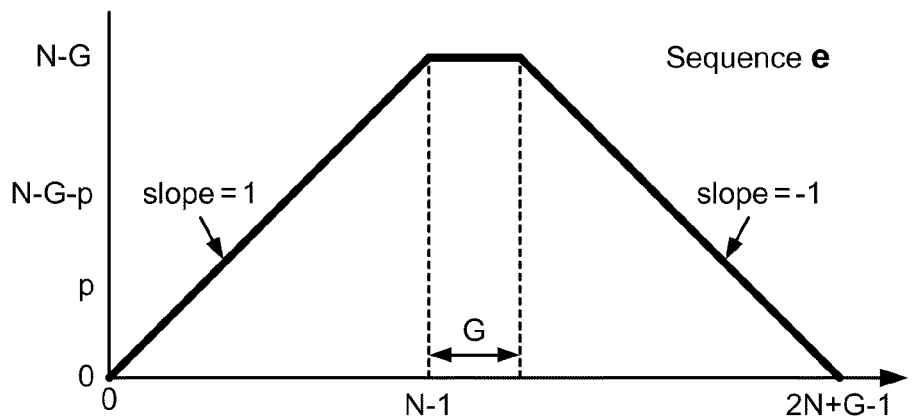

FIG. 12C shows a plot of a sequence e of weights of length 2N+G. The weights in sequence e are not a function of FFT window position p.

Equation (18) may be computed by (i) convolving sequence e with vector h and (ii) selecting the required samples of the resultant output sequence (e.g., for a range of timing errors of interest between −N and +N). The relationship between the original optimization in equation (18) and the convolution-based maximization may be expressed as:

$$p_{NEW} = \arg\min_p c_p h = \arg\max_n e \otimes h, \quad \text{Eq (21)}$$

where "$\otimes$" denotes a linear convolution.

Equation (21) may be further simplified as follows. Sequence e may be expressed as a scaled convolution of two sequences f and g, as follows:

$$e = \left(\frac{N-G}{N}\right) \cdot f \otimes g. \quad \text{Eq (22)}$$

Figure 12D:
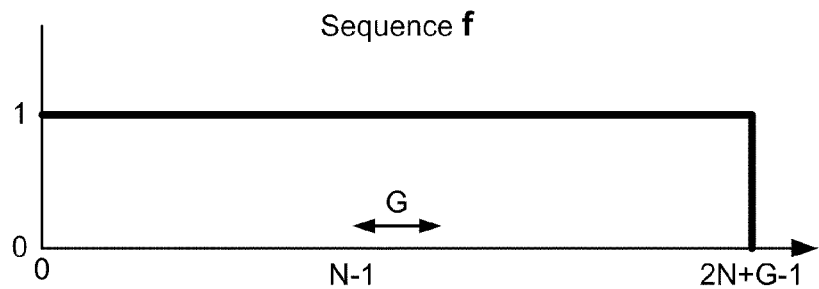
Figure 12E:
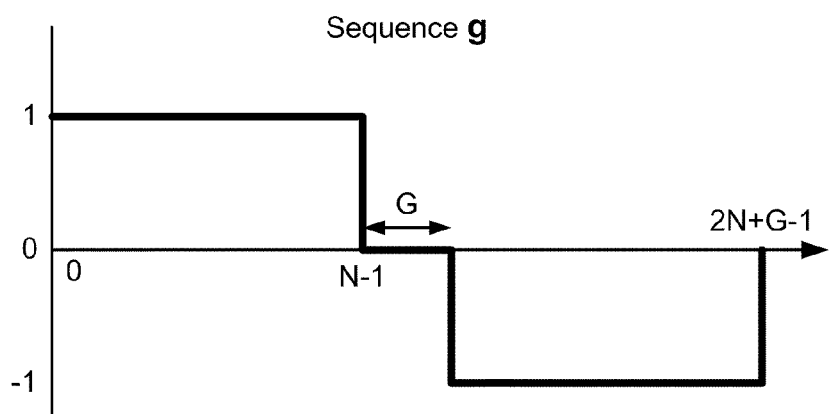

FIG. 12D shows a plot of the weights in sequence f, which resembles a rectangular window. FIG. 12E shows a plot of the weights in sequence g, which includes one positive rectangular window and one negative rectangular window. As shown in FIGS. 12D and 12E, the weights in sequences f and g have simple values of +1, 0, −1.

Equation (21) may be expressed as follows.

$$p_{NEW} = \arg\max_n (g \otimes f \otimes h). \quad \text{Eq (23)}$$

Equation (23) may be efficiently computed without using any multiplications as follows. First, a convolution $f \otimes h$ between sequence f and vector h may be computed with a cumulative sum of the channel tap energies to obtain an intermediate sequence r. Every sample of sequence r may be generated with one addition operation in one clock cycle. Next, a convolution $g \otimes r$ between sequence g and sequence r may be compute with a moving average to obtain a final sequence y. In particular, the first N values of sequence y may be computed in N clock cycles, as follows:

$$y(n)=y(n-1)+|h_n|^2, \quad \text{Eq (24)}$$

where y(n) is the n-th sample of sequence y.

The next G values of sequence y may be computed in 2G clock cycles, as follows:

$$y(n)=y(n-1)+|h_n|^2-|h_n-N|^2. \quad \text{Eq (25)}$$

The following N values of sequence y may be computed in 3N clock cycles, as follows:

$$y(n)=y(n-1)+|h_n|^2-|h_n-N|^2-|h_n-M-G|^2. \quad \text{Eq (26)}$$

Once all values of sequence y have been computed, the largest value in sequence y may be identified. The index for this largest value in sequence y may be provided as the new FFT window position $p_{NEW}$.

The one-shot computation described above essentially evaluates the equivalent metric of ISI and ICI in equation (18) for different possible FFT window positions. The FFT window position with the lowest combined ISI and ICI may be selected. The one-shot computation based on the equivalent metric may provide good performance with simple computation using only additions and no multiplications. The one-shot computation may also be based on other metrics of ISI and ICI.

The FFT window position may be updated based on inner TTL 920, e.g., as shown in FIG. 11 and described above. The FFT window position may also be computed in one shot, as also described above. These two schemes for determining the FFT window position may minimize the total ISI and ICI by taking into account the entire CIR estimate, which may provide good performance. The FFT window position may also be determined in other manners based on the CIR estimate and a metric of ISI and ICI.

Outer TTL 910 may correct large timing errors and avoid FAP/LAP ambiguity. Once outer TTL 910 converges, inner TTL 920 may make fine updates to the FFT window position by assuming that the CIR estimate is not aliased.

In yet another aspect, outer TTL 910 may detect for large timing errors based on multiple CIR estimates obtained with multiple FFT windows placed at a large time offset from one another. The energies of the CIR estimates may be computed and used to determine large timing errors.

Figure 13:
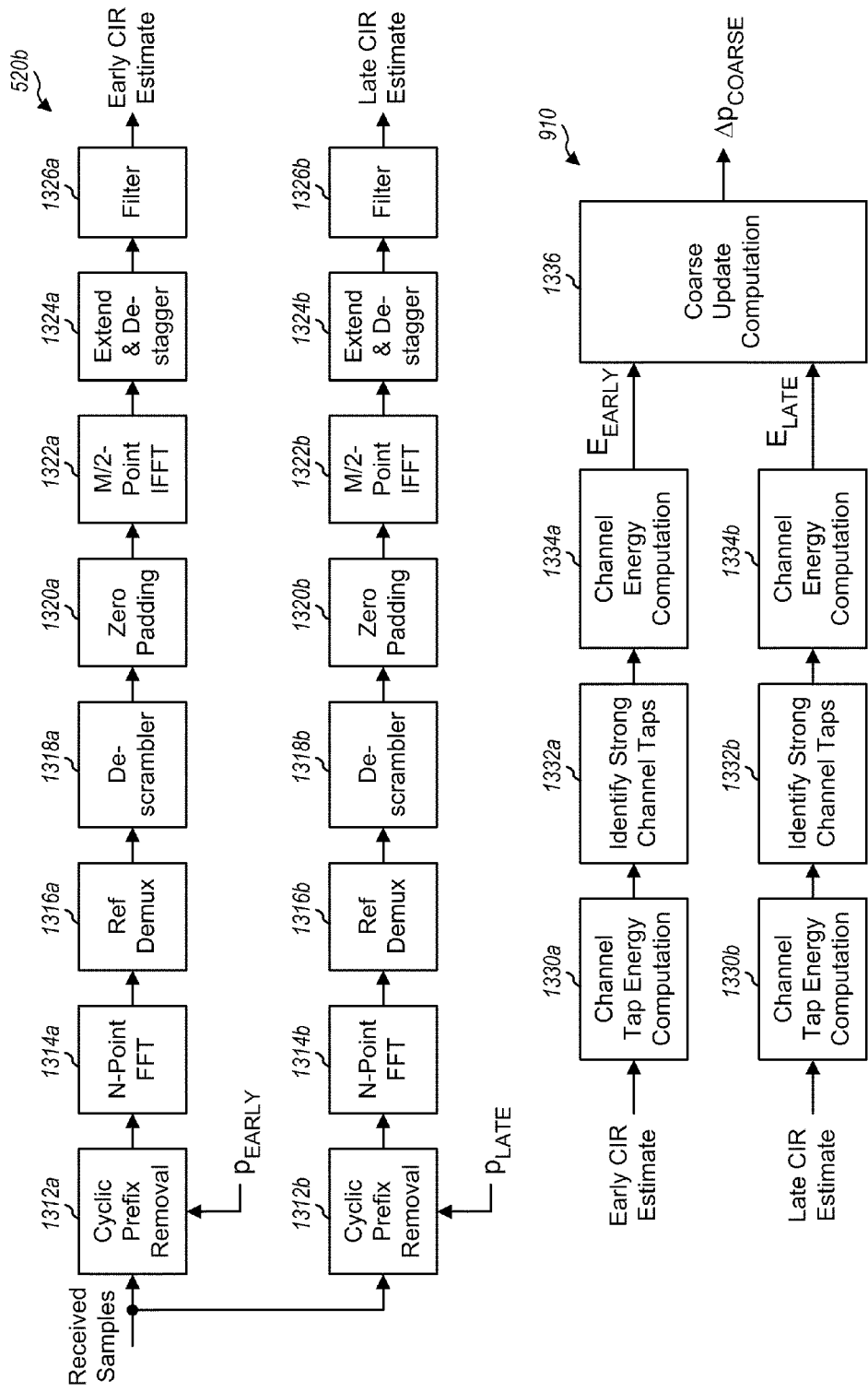
FIG. 13 shows a block diagram of an outer TTL.

FIG. 13 shows a block diagram of a design of a channel estimator 520b and outer TTL 910. Channel estimator 520b may be part of channel estimator 520 in FIG. 5. In the design shown in FIG. 13, two FFTs may be performed based on late and early FFT windows spaced sufficiently far apart. The early FFT window may be at an early position of $p_{EARLY}=p_{CURRENT}-\Delta_{OFFSET}$ and the late FFT window may be at a late position of $p_{LATE}=p_{CURRENT}+\Delta_{OFFSET}$, where $\Delta_{OFFSET}$ may be any suitable offset and may be equal to 2G, or 3G/2, or some other value.

For the first FFT at the early FFT window position, a unit 1312a may obtain a stream of received samples and may provide N received samples determined by the early FFT window at position $p_{EARLY}$. An FFT unit 1314a may perform an N-point FFT on the N received samples from unit 1312a and may provide N received symbols for the N total subcarriers. A demultiplexer 1316a may obtain the N received symbols and provide received reference symbols from the pilot subcarriers. A descrambler 1318a may obtain the received reference symbols and may remove the modulation in these symbols. A unit 1320a may append a sufficient number of zeros to obtain M/2 channel gains and zeros. A unit 1322a may perform an M/2-point IFFT on the M/2 channel gains and zeros to obtain an initial CIR estimate comprising M/2 channel taps. A unit 1324a may extend the initial CIR estimate by a factor of two and may apply a phase ramp for de-staggering the different pilot subcarriers in different symbol periods. A filter 1326a may filter the output of unit 1324a and may provide an early CIR estimate for the early FFT window at $p_{EARLY}$. Units 1316a through 1326a may perform the processing described above to obtain a CIR estimate for each transmit-receive antenna pair. For the second FFT at the late FFT window position, unit 1312b through 1326b may similarly process N received samples determined by the late FFT window at position $p_{LATE}$ and may provide a late CIR estimate for each transmit-receive antenna pair.

Between the early and late CIR estimates, the CIR estimate with more "structure" may indicate the direction in which the FFT window position should be updated. This may be because more signal energy may be exhibited in either the early or late CIR estimate. In one design, the CIR estimate with more structure may be determined based on the total energy of some large peaks of the CIR estimates. For example, when the late FFT window position is off, the resultant FFT output should experience a loss in signal energy. This may result in the early CIR having a larger total energy for large peaks. The difference in the early and late total energies may be used to form a discriminator to drive outer TTL 910. It may be shown that the above operation may be equivalent to performing a circular convolution between an equivalent time-domain reference signal pattern against each of the sequences of received samples for the early and late FFT windows. Each circular convolution may provide the energies of the channel taps.

Within outer TTL 910, a unit 1330a may receive the early CIR estimate comprising M channel taps and may compute the energy of each channel tap. In one design, unit 1330a may sum the energy of each channel tap across all OFDM symbols carrying the CRS in each subframe. A unit 1332a may identify strong channel taps in the early CIR estimate. In one design, unit 1332a may identify S strongest channel taps for each transmit-receive antenna pair, where S may be equal to 1, 2, 4, 6, 8, or some other value. S may also be dependent on M. In another design, unit 1332a may identify all sufficiently strong channel taps (e.g., with energy above a threshold) for each transmit-receive antenna pair. Unit 1332a may also identify strong channel taps in other manners to attempt to collect as much channel tap energy as possible while excluding as much noise as possible. A unit 1334a may sum the energies of the strong channel taps identified by unit 1332a to obtain an early channel energy $E_{EARLY}$. Similarly, units 1330b, 1332b and 1334b may receive and process the late CIR estimate comprising M channel taps in similar manner as units 1330a, 1332a and 1334a and may provide the late channel energy $E_{LATE}$ for strong channel taps in the late CIR estimate.

A unit 1336 may receive $E_{EARLY}$ and $E_{LATE}$ and may determine a coarse update for the FFT window position, as follows:

$$\Delta_{p_{COARSE}} = \left(\frac{E_{LATE} - E_{EARLY}}{E_{LATE} + E_{EARLY}}\right) \cdot \Delta_{p_{COARSE,MAX}}, \quad \text{Eq (27)}$$

where $\Delta_{p_{COARSE,MAX}}$ is a maximum coarse step size for updating the FFT window position by outer TTL 910, and $\Delta_{p_{COARSE}}$ is a coarse update for the FFT window position from outer TTL 910.

Equation (27) shows a design of a discriminator for coarse FFT 910. This discriminator uses a metric defined based on ISI and ICI to compute the coarse update $\Delta p_{COARSE}$. The metric includes the quantity within parenthesis in equation (27) and is defined as a function of ISI and ICI. Outer TTL 910 may converge when the total energies for the early and late FFT windows are approximately balanced. The maximum coarse step size $\Delta p_{COARSE,MAX}$ may be selected so that outer TTL 910 can provide good performance. In particular, $\Delta p_{COARSE,MAX}$ may be selected to be sufficiently large so that outer TTL 910 can quickly detect and remove FAP/LAP aliasing, but not too large to avoid causing big residual jitter when outer TTL 910 is used in conjunction with inner TTL 920 in joint loop operation.

Other metrics based on ISI and ICI may also be used to drive outer TTL 910. For example, in another design that may be especially applicable for WiMAX, early and late CINR estimates based on preamble sequence may be used to derive a coarse update for the FFT window position. The CINR estimates may be determined in the frequency domain. This design may save two IFFTs per transmit-receive antenna pair, since the CINR estimation may be done in the frequency domain and there may be no need to compute the early and late CIR estimates.

Referring back to FIG. 9, the coarse update $\Delta p_{COARSE}$ from outer TTL 910 and the fine update $\Delta p_{FINE}$ from inner TTL 920 may be scaled and combined to obtain the joint update $\Delta p_{JOINT}$ for the FFT window position. The FFT window position may then be updated based on $\Delta p_{JOINT}$, as follows:

$$p_{NEW} = p_{CURRENT} + \Delta p_{JOINT}, \text{ and} \qquad \text{Eq (28)}$$

$$\Delta p_{JOINT} = \Delta p_{COARSE} \cdot \alpha \cdot K_{OUTER} + \Delta p_{FINE} \cdot (1-\alpha) \cdot K_{INNER}. \qquad \text{Eq (29)}$$

In one design, unit 930 may receive $\Delta p_{COARSE}$ and may provide the first weight $\alpha$ for the coarse update and the second weight $(1-\alpha)$ for the fine update based on a function of $\Delta p_{COARSE}$. In another design, unit 930 may receive and filter $\Delta p_{COARSE}$ to obtain a filtered $\Delta p_{COARSE}$. Unit 930 may then provide the first and second weights based on a function of the filtered $\Delta p_{COARSE}$.

Figure 14:
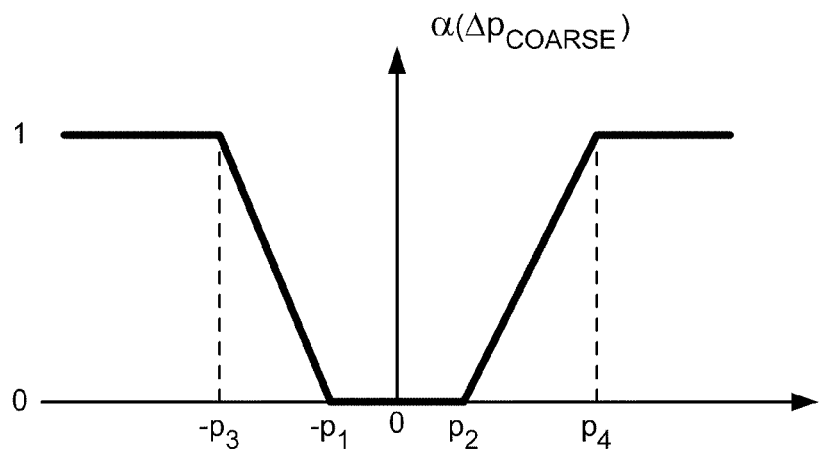
FIG. 14 shows a plot of a weight for a coarse update from the outer TTL.

FIG. 14 shows a plot of a design of a function used to generate the first weight for the coarse update for the FFT window position. In the design shown in FIG. 14, the first weight $\alpha$ is equal to zero when $-p_1 \leq \Delta p_{COARSE} \leq p_2$. In this case, $\Delta p_{COARSE}$ is given no weight, the contribution from outer TTL 910 is zero, and inner TTL 920 takes over completely. Conversely, the first weight $\alpha$ is equal to 1.0 when $\Delta p_{COARSE} \leq -p_3$ or $\Delta p_{COARSE} \geq p_4$. In this case, $\Delta p_{FINE}$ is given no weight, the contribution from inner TTL 920 is zero, and outer TTL 910 takes over completely. In the region from $-p_3$ to $-p_1$ and in the region from $p_2$ to $p_4$, a convex combination of $\Delta p_{COARSE}$ and $\Delta p_{FINE}$ is used, with the value of the first weight $\alpha$ varying linearly between 0 and 1. This may ensure early detection and smooth correction of large timing errors.

In general, the function used to derive the first weight $\alpha$ may or may not be symmetric about the y-axis. An asymmetric function may allow for asymmetric combining of the outputs from the coarse and inner TTLs. Asymmetric combining may be helpful when the previous and subsequent OFDM symbols do not have the same noise variance. Asymmetric combining may help reduce the effects of bias due to asymmetric noise variance.

The first loop gain $K_{OUTER}$ for outer TTL 910 and the second loop gain $K_{INNER}$ for inner TTL 920 may be selected to obtain the desired acquisition speed (or rate of convergence) and the desired jitter. In one design, a single operating mode may be supported, and the first and second loop gains may be selected based on a tradeoff between acquisition speed and jitter. In another design, multiple operating modes may be supported, and a different set of first and second loop gains may be used for each operating mode. For example, a connected mode and an idle mode may be supported. The idle mode may also be referred to as an acquisition mode, a discontinuous reception (DRX) mode, etc. The connected mode may also be referred to as a tracking mode, a non-DRX mode, etc. In the connected mode, a UE may continuously receive reference symbols, and TTL 530 may adjust timing slowly to track channel variations, thereby also averaging noise. In the idle mode, the UE may be awake for a short duration (e.g., few milliseconds) between long sleep cycles (e.g., few seconds). During the awake time, TTL 530 may quickly refine its timing before performing data demodulation (e.g., to receive a page). The first and second loop gains may be defined with larger values in the idle mode to provide faster acquisition and with smaller values in the connected mode to provide less jitter. In general, any number of operating modes may be supported for overall TTL 530, outer TTL 910, and inner TTL 920. The same or different numbers of operating modes may be supported for TTLs 530, 910 and 920.

In the design shown in FIG. 9, the output from outer TTL 910 may be used to update the FFT window position. This may ensure that the FFT window position can be placed such that FAP/LAP ambiguity can be removed Inner TTL 920 may operate with the assumption that FAP/LAP ambiguity is removed by outer TTL 910 and that the FAP and LAP are reliably known. This may ensure proper operation of inner TTL 920, which may have a smaller operating range than outer TTL 910.

TTL 530 in FIG. 9 may operate under an assumption that both negative and positive time offsets can be rectified by inner TTL 920. It may thus be beneficial to ensure roughly equal importance to both positive and negative time offsets, when weights $w_m$ are applied in equations (14) and (15). In one design, a constant right cyclic shift may be applied to either weights $w_m$ or the channel taps in a CIR estimate in order to align the FAP within the weighting function's cyclic prefix zone and make TTL 530 more robust. This cyclic shift may ensure that signal paths aliased to the end of the CIR estimate by virtue of the FFT window position being too much to the right of the correct position can be brought to back, before applying weights $w_m$. This cyclic shift may change the origin and may be denoted as shiftOrigin. This cyclic shift may be one third of the IFFT size M, or one third of the CIR length, or some other value. This cyclic shift may increase sensitivity to the birth of early signal paths but would also limit the maximum delay spread that can be handled by inner TTL 920.

TTL 530, outer TTL 910, and inner TTL 920 may provide various advantages. First, these TTLs may reduce residual timing errors in steady state, so that CINR loss may be small in comparison to a case with perfect timing that can maximize CINR for a given multipath scenario. Outer TTL 910 can reduce a large timing error quickly, e.g., during each wake-up period in DRX operation. Outer TTL 910 can also handle a large delay spread, e.g., larger than the cyclic prefix length. Inner TTL 920 can continuously track changes in the multipath channel conditions and make fine timing adjustments to achieve good performance. The metrics used for outer TTL 910 and inner TTL 920 may be based on minimizing ISI and ICI, which may maximize CINR. Outer TTL 910 and inner TTL 920 can thus place the FFT window to minimize ISI and ICI.

Figure 15:
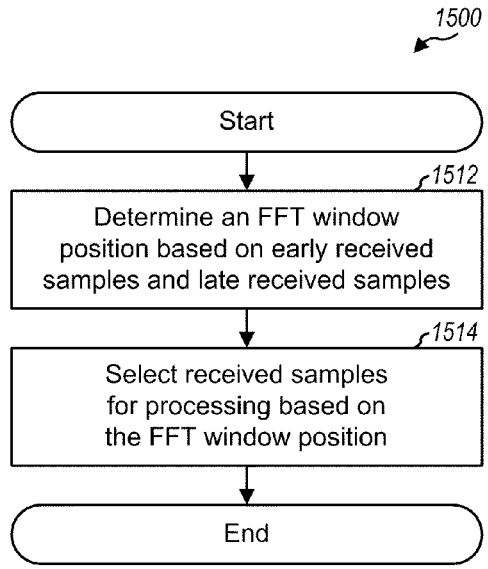
FIG. 15 shows a process for performing time tracking

FIG. 15 shows a design of a process 1500 for performing time tracking Process 1500 may be performed by a receiver, which may be part of a UE, or a base station, or some other entity. The receiver may determine an FFT window position based on early received samples and late received samples (block 1512). In one design, the receiver may determine an early FFT window and a late FFT window based on a current FFT window position. The early and late FFT windows may be sufficiently far from the current FFT window position. In one design, the early FFT window may be at least one cyclic prefix length earlier than the current FFT window position, and the late FFT window may be at least one cyclic prefix length later than the current FFT window position. The receiver may select the early received samples based on the early FFT window and may select the late received samples based on the late FFT window.

In one design, the receiver may update the FFT window position with a TTL and may determine an amount to update the FFT window position based on the early and late received samples. In one design, the receiver may derive a first CIR estimate based on the early received samples and may derive a second CIR estimate based on the late received samples. The receiver may then determine the FFT window position based on the first and second CIR estimates. In one design, the receiver may determine an early channel energy $E_{EARLY}$ based on the first CIR estimate and may determine a late channel energy $E_{LATE}$ based on the second CIR estimate. The receiver may then update the FFT window position based on the early channel energy and the late channel energy. In one design, the receiver may determine a difference between the early and late channel energies. The receiver may then determine the amount to update the FFT window position based on the difference between the early and late channel energies, e.g., as shown in equation (27). The FFT window position may be updated to balance the early and late channel energies and to minimize the difference between the early and late channel energies.

The receiver may determine the early and late channel energies in various manners. In one design, the receiver may identify a predetermined number of strongest channel taps in the first CIR estimate and may compute the early channel energy based on the total energy of the identified channel taps. In another design, the receiver may identify channel taps in the first CIR estimate with energy exceeding a threshold and may compute the early channel energy based on the total energy of the identified channel taps. The receiver may also identify strong channel taps in other manners. The receiver may compute the late channel energy in similar manner as the early channel energy.

The receiver may select received samples for processing based on the FFT window position (block 1514). In one design, the receiver may select N received samples of an OFDM symbol comprising N+G samples based on the FFT window position, where N is the total number of subcarriers and G is the cyclic prefix length. In another design, the receiver may select N received samples of an SC-FDM symbol comprising N+G samples based on the FFT window position. The FFT window position may also be used in other manners at the receiver.

Figure 16:
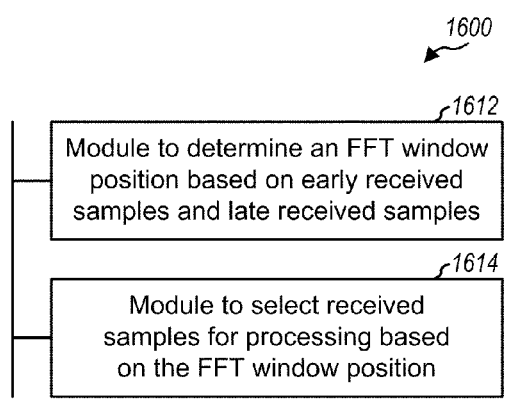
FIG. 16 shows an apparatus for performing time tracking.

FIG. 16 shows a design of an apparatus 1600 for performing time tracking at a receiver. Apparatus 1600 includes a module 1612 to determine an FFT window position based on early received samples and late received samples, and a module 1614 to select received samples for processing based on the FFT window position.

Figure 17:
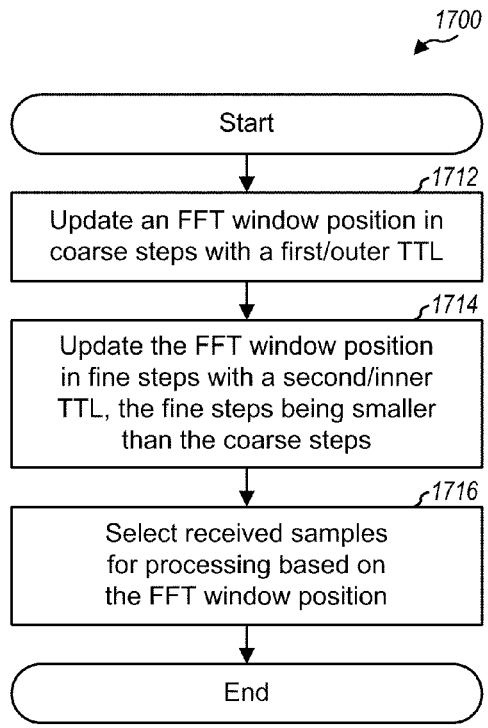
FIG. 17 shows another process for performing time tracking

FIG. 17 shows a design of a process 1700 for performing time tracking. Process 1700 may be performed by a receiver, which may be part of a UE, or a base station, or some other entity. The receiver may update an FFT window position in coarse steps with a first/outer TTL (block 1712). The receiver may also update the FFT window position in fine steps with a second/inner TTL, with the fine steps being smaller than the coarse steps (block 1714). The receiver may select received samples for processing based on the FFT window position (block 1716).

In one design, the FFT window position may be updated (i) by the first TTL to remove ambiguity in FAP and LAP in a CIR estimate and (ii) by the second TTL with the ambiguity in the FAP and LAP removed. In one design, the first TTL may operate based on early and late CIR estimates obtained based on early and late FFT window positions, respectively. The second TTL may operate based on on-time CIR estimates obtained based on the current FFT window position.

In one design of blocks 1712 and 1714, the receiver may determine a coarse step $\Delta p_{COARSE}$ for updating the FFT window position based on the first TTL and may determine a fine step $\Delta p_{FINE}$ for updating the FFT window position based on the second TTL. In one design, the receiver may determine the fine step by determining an early energy for signal paths earlier than the FFT window position, determining a late energy for signal paths later than the FFT window position, and determining the fine step based on the early energy and the late energy, e.g., as shown in equation (16). In one design, the receiver may determine the coarse step by deriving a first CIR estimate based on early received samples, deriving a second CIR estimate based on late received samples, determining an early channel energy based on the first CIR estimate, determining a late channel energy based on the second CIR estimate, and determining the coarse step based on the early and late channel energies, e.g., as shown in equation (27).

The receiver may update the FFT window position based on the coarse and fine steps. In one design, the receiver may multiply the coarse step with a first weight (e.g., α) to obtain a weighted coarse step and may multiply the fine step with a second weight (e.g., 1−α) to obtain a weighted fine step, e.g., as shown in FIG. 9. In one design, the first weight may have a zero value if the coarse step is between a first negative value (e.g., $-p_1$ in FIG. 14) and a first positive value (e.g., $p_2$ in FIG. 14). The first weight may have a non-zero value (e.g., 1.0) if the coarse step is less than a second negative value (e.g., $-p_3$ in FIG. 14) or is greater than a second positive value (e.g., $p_4$ in FIG. 14). The second negative value may be less than the first negative value, and the second positive value may be greater than the first positive value. The second weight may be inversely related to the first weight.

The receiver may update the FFT window position based on the weighted coarse step and the weighted fine step. In one design, the receiver may multiply the weighted coarse step with a first loop gain (e.g., $K_{OUTER}$) for the first TTL to obtain a scaled coarse step, e.g., as shown in FIG. 9. The receiver may also multiply the weighted fine step with a second loop gain (e.g., $K_{INNER}$) for the second TTL to obtain a scaled fine step. The receiver may then update the FFT window position based on the scaled coarse step and the scaled fine step, e.g., as shown in equations (28) and (29). In one design, multiple operating modes (e.g., a connected mode and an idle mode) may be supported, and the first and second loop gains may have different values for different operating modes.

Figure 18:
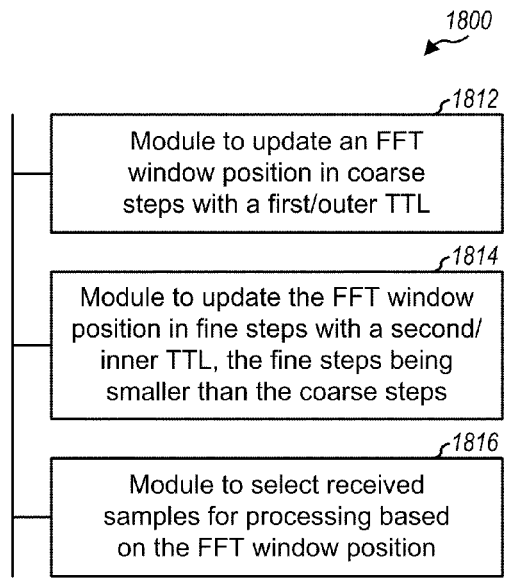
FIG. 18 shows another apparatus for performing time tracking.

FIG. 18 shows a design of an apparatus 1800 for performing time tracking at a receiver. Apparatus 1800 includes a module 1812 to update an FFT window position in coarse steps with a first/outer TTL, a module 1814 to update the FFT window position in fine steps with a second/inner TTL, the fine steps being smaller than the coarse steps, and a module 1816 to select received samples for processing based on the FFT window position.

The modules in FIGS. 16 and 18 may comprise processors, electronic devices, hardware devices, electronic components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for communication, comprising:
deriving a first channel impulse response (CIR) estimate based on early received samples;
deriving a second CIR estimate based on late received samples;
determining a fast Fourier transform (FFT) window position based on the first and second CIR estimates; and
selecting received samples for processing based on the FFT window position.

2. The method of claim 1, further comprising:
determining an early FFT window and a late FFT window based on a current FFT window position;
selecting the early received samples based on the early FFT window; and
selecting the late received samples based on the late FFT window.

3. The method of claim 2, wherein the early FFT window is at least one cyclic prefix length earlier than the current FFT window position, and wherein the late FFT window is at least one cyclic prefix length later than the current FFT window position.

4. The method of claim 1, wherein the determining the FFT window position comprises:
updating the FFT window position with a time tracking loop(TTL); and
determining an amount to update the FFT window position based on the early and late received samples.

5. The method of claim 1, wherein the determining the FFT window position comprises:

determining an early channel energy based on the first CIR estimate;

determining a late channel energy based on the second CIR estimate; and updating the FFT window position based on the early channel energy and the late channel energy.

6. The method of claim 5, wherein the updating the FFT window position comprises determining a difference between the early channel energy and the late channel energy, and determining an amount to update the FFT window position based on the difference between the early channel energy and the late channel energy.

7. The method of claim 5, wherein the FFT window position is updated to balance the early channel energy and the late channel energy and to minimize a difference between the early channel energy and the late channel energy.

8. The method of claim 5, wherein the determining the early channel energy comprises:

identifying a predetermined number of strongest channel taps in the first CIR estimate, and computing the early channel energy based on total energy of the identified channel taps.

9. The method of claim 5, wherein the determining the early channel energy comprises:

identifying channel taps in the first CIR estimate with energy exceeding a threshold, and computing the early channel energy based on total energy of the identified channel taps.

10. The method of claim 1, wherein the selecting the received samples for processing comprises selecting N received samples of an orthogonal frequency division multiplexing (OFDM) symbol comprising N+G samples based on the FFT window position, where N is a total number of subcarriers and G is a cyclic prefix length.

11. The method of claim 1, wherein the selecting the received samples for processing comprises selecting N received samples of a single-carrier frequency division multiplexing (SC-FDM) symbol comprising N+G samples based on the FFT window position, where N is a total number of subcarriers and G is a cyclic prefix length.

12. An apparatus for communication, comprising:

means for deriving a first channel impulse response (CIR) estimate based on early received samples;

means for deriving a second CIR estimate based on late received samples;

means for determining a fast Fourier transform (FFT) window position based on the first and second CIR estimates; and means for selecting received samples for processing based on the FFT window position.

13. The apparatus of claim 12, further comprising:

means for determining an early FFT window and a late FFT window based on a current FFT window position;

means for selecting the early received samples based on the early FFT window; and means for selecting the late received samples based on the late FFT window.

14. The apparatus of claim 12, wherein the means for determining the FFT window position comprises:

means for updating the FFT window position with a time tracking loop(TTL); and means for determining an amount to update the FFT window position based on the early and late received samples.

15. The apparatus of claim 12, wherein the means for determining the FFT window position comprises:

means for determining an early channel energy based on the first CIR estimate;

means for determining a late channel energy based on the second CIR estimate; and means for updating the FFT window position based on the early channel energy and the late channel energy.

16. An apparatus for communication, comprising:

at least one processor configured to:

derive a first channel impulse response (CIR) estimate based on early received samples;

derive a second CIR estimate based on late received samples;

determine a fast Fourier transform (FFT) window position based on the first and second CIR estimates; and select received samples for processing based on the FFT window position.

17. The apparatus of claim 16, wherein the at least one processor is further configured to determine an early FFT window and a late FFT window based on a current FFT window position, to select the early received samples based on the early FFT window, and to select the late received samples based on the late FFT window.

18. The apparatus of claim 16, wherein the at least one processor is further configured to update the FFT window position with a time tracking loop (TTL), and to determine an amount to update the FFT window position based on the early and late received samples.

19. The apparatus of claim 16, wherein the at least one processor is further configured to determine an early channel energy based on the first CIR estimate, to determine a late channel energy based on the second CIR estimate, and to update the FFT window position based on the early channel energy and the late channel energy.

20. A computer program product, comprising:

a non-transitory computer-readable medium comprising:

code for causing at least one computer to derive a first channel impulse response (CIR) estimate based on early received samples;

code for causing at least one computer to derive a second CIR estimate based on late received samples;

code for causing at least one computer to determine a fast Fourier transform (FFT) window position based on the first and second CIR estimates; and code for causing the at least one computer to select received samples for processing based on the FFT window position.

* * * * *